United States Patent
Fayneh et al.

(10) Patent No.: US 12,470,223 B2
(45) Date of Patent: Nov. 11, 2025

(54) ADAPTIVE FREQUENCY SCALING BASED ON CLOCK CYCLE TIME MEASUREMENT

(71) Applicant: PROTEANTECS LTD., Haifa (IL)

(72) Inventors: Eyal Fayneh, Givatayim (IL); Inbar Weintrob, Givat Ada (IL); Evelyn Landman, Haifa (IL); Faten Tanasra, Nazareth (IL); Guy Redler, Haifa (IL); Shai Tzroia, Haifa (IL)

(73) Assignee: PROTEANTECS LTD., Haifa (IL)

( * ) Notice: Subject to any disclaimer, the term of this patent is extended or adjusted under 35 U.S.C. 154(b) by 38 days.

(21) Appl. No.: 18/285,719

(22) PCT Filed: Apr. 7, 2022

(86) PCT No.: PCT/IL2022/050363
§ 371 (c)(1),
(2) Date: Oct. 5, 2023

(87) PCT Pub. No.: WO2022/215076
PCT Pub. Date: Oct. 13, 2022

(65) Prior Publication Data
US 2024/0372554 A1    Nov. 7, 2024

Related U.S. Application Data

(60) Provisional application No. 63/171,622, filed on Apr. 7, 2021.

(51) Int. Cl.
*H03L 7/093* (2006.01)
*G06F 1/04* (2006.01)
(Continued)

(52) U.S. Cl.
CPC ............ *H03L 7/093* (2013.01); *G06F 1/04* (2013.01); *G06F 1/08* (2013.01); *G06F 1/28* (2013.01); *G06F 1/305* (2013.01); *H03L 2207/08* (2013.01)

(58) Field of Classification Search
CPC ..... G06F 1/08; G06F 1/28; G06F 1/04; G06F 1/305; H03L 7/093; H03L 2207/08
(Continued)

(56) References Cited

U.S. PATENT DOCUMENTS

| 4,555,663 A | 11/1985 | Shimizu |
| 5,548,539 A | 8/1996 | Vlach et al. |

(Continued)

FOREIGN PATENT DOCUMENTS

| CN | 1886668 A | 12/2006 |
| CN | 101014991 A | 8/2007 |

(Continued)

OTHER PUBLICATIONS

Kan Takeuchi et al; "FEOL/BEOL wear-out estimator using stress-to-frequency conversion of voltage/temperature-sensitive ring oscillators for 28nm automotive MCUs"; IEEE, pp. 265-268, Oct. 20, 2016. doi: 10.1109/ESSCIRC.2016.7598293.

(Continued)

*Primary Examiner* — Ji H Bae
(74) *Attorney, Agent, or Firm* — The Roy Gross Law Firm, LLC; Roy D. Gross

(57) ABSTRACT

Generation of a clock signal in a semiconductor integrated circuit (IC) is controlled using a Noise Modulation Agent (NMA), configured to measure the clock signal and output a parameter indicative of an effective cycle time of the clock signal. An Adaptive Frequency Scaling (AFS) circuit selectively adjusts a frequency of the clock signal, based on the output of the NMA indicating a change in a power supply voltage of the semiconductor IC.

20 Claims, 11 Drawing Sheets

(51) Int. Cl.
  *G06F 1/08* (2006.01)
  *G06F 1/28* (2006.01)
  *G06F 1/30* (2006.01)

(58) Field of Classification Search
  USPC .......................................... 713/340, 500–503
  See application file for complete search history.

(56) References Cited

U.S. PATENT DOCUMENTS

| | | | |
|---|---|---|---|
| 5,748,509 | A | 5/1998 | Fewster |
| 5,774,403 | A | 6/1998 | Clark, II et al. |
| 5,818,251 | A | 10/1998 | Intrater |
| 5,895,629 | A | 4/1999 | Russell et al. |
| 5,956,497 | A | 9/1999 | Ratzel et al. |
| 5,966,527 | A | 10/1999 | Krivokapic et al. |
| 6,172,546 | B1 | 1/2001 | Liu et al. |
| 6,182,253 | B1 | 1/2001 | Lawrence et al. |
| 6,486,716 | B1 | 11/2002 | Minami et al. |
| 6,555,872 | B1 | 4/2003 | Dennen |
| 6,586,921 | B1 | 7/2003 | Sunter |
| 6,683,484 | B1 | 1/2004 | Kueng et al. |
| 6,807,503 | B2 | 10/2004 | Ye et al. |
| 6,873,926 | B1 | 3/2005 | Diab |
| 6,882,172 | B1 | 4/2005 | Suzuki et al. |
| 6,948,388 | B1 | 9/2005 | Clayton et al. |
| 7,038,483 | B1 | 5/2006 | Suzuki et al. |
| 7,067,335 | B2 | 6/2006 | Weiner et al. |
| 7,069,458 | B1 | 6/2006 | Sardi et al. |
| 7,254,507 | B2 | 8/2007 | Dosho et al. |
| 7,288,958 | B2 | 10/2007 | Takagi |
| 7,369,893 | B2 | 5/2008 | Gunderson |
| 7,443,189 | B2 | 10/2008 | Ramappa |
| 7,455,450 | B2 | 11/2008 | Liu et al. |
| 7,501,832 | B2 | 3/2009 | Spuhler et al. |
| 7,612,603 | B1 * | 11/2009 | Petricek .................. H02M 3/07 |
| | | | 327/306 |
| 7,649,373 | B2 | 1/2010 | Tokunaga |
| 7,701,246 | B1 | 4/2010 | Plants et al. |
| 7,818,601 | B2 | 10/2010 | LaBerge |
| 7,877,657 | B1 | 1/2011 | Miller et al. |
| 7,940,862 | B2 | 5/2011 | Tanaka et al. |
| 8,001,512 | B1 | 8/2011 | White |
| 8,086,978 | B2 | 12/2011 | Zhang et al. |
| 8,170,067 | B2 | 5/2012 | Zerbe et al. |
| 8,279,976 | B2 | 10/2012 | Lin et al. |
| 8,310,265 | B2 | 11/2012 | Zjajo et al. |
| 8,365,115 | B2 | 1/2013 | Liu et al. |
| 8,418,103 | B2 | 4/2013 | Wang et al. |
| 8,479,130 | B1 | 7/2013 | Zhang et al. |
| 8,633,722 | B1 | 1/2014 | Lai |
| 8,825,158 | B2 | 9/2014 | Swerdlow |
| 8,996,937 | B2 | 3/2015 | Jain et al. |
| 9,275,706 | B2 | 3/2016 | Tam |
| 9,424,952 | B1 | 8/2016 | Seok et al. |
| 9,483,098 | B2 * | 11/2016 | Bridges .................. G06F 1/305 |
| 9,490,787 | B1 | 11/2016 | Kho et al. |
| 9,536,038 | B1 | 1/2017 | Quinton et al. |
| 9,564,883 | B1 | 2/2017 | Quinton et al. |
| 9,564,884 | B1 | 2/2017 | Quinton et al. |
| 9,568,546 | B2 | 2/2017 | Franzon |
| 9,632,126 | B2 | 4/2017 | Yoon et al. |
| 9,714,966 | B2 | 7/2017 | Chen et al. |
| 9,760,672 | B1 | 9/2017 | Taneja et al. |
| 9,791,834 | B1 | 10/2017 | Nassar et al. |
| 9,954,455 | B2 | 4/2018 | Lin et al. |
| 9,977,078 | B2 | 5/2018 | Loke et al. |
| 9,991,879 | B2 | 6/2018 | Huang |
| 10,452,793 | B2 | 10/2019 | Joshi et al. |
| 10,490,547 | B1 | 11/2019 | Ali et al. |
| 10,509,104 | B1 | 12/2019 | Dato |
| 10,530,347 | B2 | 1/2020 | Tang et al. |
| 11,036,266 | B2 | 6/2021 | Srivastava et al. |
| 11,081,193 | B1 | 8/2021 | Tang |
| 11,409,323 | B2 | 8/2022 | Herberholz et al. |
| 11,929,772 | B2 | 3/2024 | Seol et al. |
| 12,013,800 | B1 | 6/2024 | Fayneh et al. |
| 2001/0013111 | A1 | 8/2001 | Bishop et al. |
| 2002/0036328 | A1 | 3/2002 | Richards, Jr. et al. |
| 2004/0009616 | A1 | 1/2004 | Huisman et al. |
| 2004/0015793 | A1 | 1/2004 | Saxena et al. |
| 2004/0017234 | A1 * | 1/2004 | Tam ...................... G06F 1/324 |
| | | | 327/141 |
| 2004/0230385 | A1 | 11/2004 | Bechhoefer et al. |
| 2004/0230396 | A1 | 11/2004 | Ye et al. |
| 2004/0267479 | A1 | 12/2004 | Querbach et al. |
| 2005/0053162 | A1 | 3/2005 | Goishi |
| 2005/0104175 | A1 | 5/2005 | Itano et al. |
| 2005/0114056 | A1 | 5/2005 | Patel et al. |
| 2005/0134350 | A1 | 6/2005 | Huang et al. |
| 2005/0134394 | A1 | 6/2005 | Liu |
| 2005/0154552 | A1 | 7/2005 | Stroud et al. |
| 2005/0193302 | A1 | 9/2005 | Arguelles et al. |
| 2005/0285646 | A1 | 12/2005 | Rashid |
| 2006/0049886 | A1 | 3/2006 | Agostinelli, Jr. et al. |
| 2006/0184815 | A1 * | 8/2006 | Ha ........................ H03K 5/133 |
| | | | 713/500 |
| 2006/0224374 | A1 | 10/2006 | Kwon et al. |
| 2007/0022397 | A1 | 1/2007 | Darsow et al. |
| 2007/0110199 | A1 | 5/2007 | Momtaz et al. |
| 2007/0182456 | A1 | 8/2007 | Agarwal et al. |
| 2007/0288183 | A1 | 12/2007 | Bulkes et al. |
| 2008/0071489 | A1 | 3/2008 | Wissel |
| 2008/0074521 | A1 | 3/2008 | Olsen |
| 2008/0144243 | A1 | 6/2008 | Mariani et al. |
| 2008/0147355 | A1 | 6/2008 | Fields et al. |
| 2008/0183409 | A1 | 7/2008 | Roberts et al. |
| 2008/0186001 | A1 | 8/2008 | Singh et al. |
| 2008/0186044 | A1 | 8/2008 | Singh |
| 2008/0216033 | A1 | 9/2008 | Bucossi et al. |
| 2008/0231310 | A1 | 9/2008 | Vijayaraghavan et al. |
| 2008/0262769 | A1 | 10/2008 | Kadosh et al. |
| 2009/0006914 | A1 | 1/2009 | Ko |
| 2009/0027077 | A1 | 1/2009 | Vijayaraghavan et al. |
| 2009/0044160 | A1 | 2/2009 | Bueti et al. |
| 2009/0076753 | A1 | 3/2009 | Vijayaraghavan et al. |
| 2009/0096495 | A1 | 4/2009 | Keigo |
| 2009/0105978 | A1 | 4/2009 | Schuttert et al. |
| 2009/0183043 | A1 | 7/2009 | Niwa |
| 2009/0222775 | A1 | 9/2009 | Idgunji et al. |
| 2009/0230947 | A1 | 9/2009 | Sumita et al. |
| 2009/0244998 | A1 | 10/2009 | Kim |
| 2009/0273550 | A1 | 11/2009 | Vieri et al. |
| 2009/0278576 | A1 | 11/2009 | Chakravarty |
| 2009/0306953 | A1 | 12/2009 | Liu et al. |
| 2010/0122104 | A1 | 5/2010 | Defazio et al. |
| 2010/0153896 | A1 | 6/2010 | Sewall et al. |
| 2010/0251046 | A1 | 9/2010 | Mizuno et al. |
| 2010/0253382 | A1 | 10/2010 | Wang et al. |
| 2010/0262942 | A1 | 10/2010 | Nakamura |
| 2011/0093830 | A1 | 4/2011 | Chen et al. |
| 2011/0102091 | A1 | 5/2011 | Yeric |
| 2011/0109377 | A1 | 5/2011 | Fujibe et al. |
| 2011/0113298 | A1 | 5/2011 | Van Den Eijnden |
| 2011/0169537 | A1 | 7/2011 | Ma |
| 2011/0175658 | A1 | 7/2011 | Nomura |
| 2011/0187433 | A1 | 8/2011 | Baumann et al. |
| 2011/0267096 | A1 | 11/2011 | Chlipala et al. |
| 2011/0295403 | A1 | 12/2011 | Higuchi et al. |
| 2011/0315986 | A1 | 12/2011 | Kaneda et al. |
| 2012/0025846 | A1 | 2/2012 | Minas et al. |
| 2012/0038388 | A1 | 2/2012 | Tseng et al. |
| 2012/0051395 | A1 | 3/2012 | Chen et al. |
| 2012/0063524 | A1 | 3/2012 | Stott et al. |
| 2012/0074973 | A1 | 3/2012 | Baldwin et al. |
| 2012/0163074 | A1 | 6/2012 | Franca-Neto et al. |
| 2012/0170616 | A1 | 7/2012 | Tsai et al. |
| 2012/0187991 | A1 | 7/2012 | Sathe et al. |
| 2012/0212246 | A1 | 8/2012 | Benjamin et al. |
| 2012/0217976 | A1 | 8/2012 | Clarkson |
| 2012/0221906 | A1 | 8/2012 | Shetty et al. |
| 2012/0242490 | A1 | 9/2012 | Ramaswami |
| 2013/0088256 | A1 | 4/2013 | Chlipala et al. |
| 2013/0226491 | A1 | 8/2013 | Miguelanez, II et al. |
| 2013/0241690 | A1 | 9/2013 | Wallace et al. |

(56) References Cited

U.S. PATENT DOCUMENTS

| | | | |
|---|---|---|---|
| 2013/0293270 A1 | 11/2013 | Lee et al. | |
| 2013/0335875 A1 | 12/2013 | Baumann | |
| 2014/0132293 A1 | 5/2014 | Abadir et al. | |
| 2014/0132315 A1 | 5/2014 | Sharma et al. | |
| 2014/0143586 A1 | 5/2014 | Dalumi et al. | |
| 2014/0184243 A1 | 7/2014 | Iyer et al. | |
| 2014/0254734 A1 | 9/2014 | Abdelmoneum | |
| 2015/0061707 A1 | 3/2015 | Balasubramanian et al. | |
| 2015/0061721 A1 | 3/2015 | Jeong | |
| 2015/0077136 A1 | 3/2015 | Li | |
| 2015/0100815 A1 | 4/2015 | Xanthopoulos et al. | |
| 2015/0121158 A1 | 4/2015 | Wang et al. | |
| 2015/0199223 A1 | 7/2015 | Banerjee et al. | |
| 2015/0332451 A1 | 11/2015 | Amzaleg et al. | |
| 2015/0355033 A1 | 12/2015 | Zhang et al. | |
| 2015/0365049 A1 | 12/2015 | Ozawa et al. | |
| 2016/0033574 A1 | 2/2016 | Serrer et al. | |
| 2016/0042784 A1 | 2/2016 | Rim et al. | |
| 2016/0072511 A1 | 3/2016 | Maekawa | |
| 2016/0087643 A1 | 3/2016 | Nozaki | |
| 2016/0125434 A1 | 5/2016 | Kohn et al. | |
| 2016/0131708 A1 | 5/2016 | Huang et al. | |
| 2016/0153840 A1 | 6/2016 | Huang et al. | |
| 2016/0156176 A1 | 6/2016 | Kunz, Jr. et al. | |
| 2016/0164503 A1 | 6/2016 | Kim et al. | |
| 2016/0203036 A1 | 7/2016 | Mezic et al. | |
| 2016/0254804 A1 | 9/2016 | Meng | |
| 2016/0373098 A1* | 12/2016 | Prasad | H03K 5/135 |
| 2017/0038265 A1 | 2/2017 | Abdelmoneum et al. | |
| 2017/0093399 A1 | 3/2017 | Atkinson et al. | |
| 2017/0160339 A1 | 6/2017 | Jenkins | |
| 2017/0179173 A1 | 6/2017 | Mandai et al. | |
| 2017/0199089 A1 | 7/2017 | Fritchman et al. | |
| 2017/0199228 A1 | 7/2017 | Hsieh et al. | |
| 2017/0214516 A1 | 7/2017 | Rivaud et al. | |
| 2017/0329391 A1 | 11/2017 | Jaffari et al. | |
| 2017/0344102 A1* | 11/2017 | Kolla | H02M 1/08 |
| 2017/0345490 A1 | 11/2017 | Yoshimoto et al. | |
| 2017/0364818 A1 | 12/2017 | Wu et al. | |
| 2018/0034549 A1 | 2/2018 | Kikuchi | |
| 2018/0109245 A1 | 4/2018 | Takagi | |
| 2018/0183413 A1 | 6/2018 | Wong et al. | |
| 2018/0365974 A1 | 12/2018 | Haas et al. | |
| 2019/0019096 A1 | 1/2019 | Yoshida et al. | |
| 2019/0117122 A1 | 4/2019 | Kurachi et al. | |
| 2019/0128961 A1 | 5/2019 | Heron et al. | |
| 2019/0162783 A1 | 5/2019 | Huang | |
| 2019/0187204 A1 | 6/2019 | Doescher et al. | |
| 2019/0196564 A1* | 6/2019 | Murtagh | G06F 1/12 |
| 2019/0265767 A1* | 8/2019 | Mehra | G06F 1/324 |
| 2019/0302830 A1* | 10/2019 | Chen | G06F 1/08 |
| 2019/0305074 A1 | 10/2019 | Kande et al. | |
| 2020/0028514 A1 | 1/2020 | Hanke et al. | |
| 2020/0203333 A1 | 6/2020 | Chen et al. | |
| 2020/0209070 A1 | 7/2020 | Tang et al. | |
| 2020/0309850 A1 | 10/2020 | Bismuth | |
| 2020/0313664 A1 | 10/2020 | Azam et al. | |
| 2021/0181251 A1 | 6/2021 | Hsieh et al. | |
| 2021/0325455 A1 | 10/2021 | Fayneh et al. | |
| 2021/0341535 A1 | 11/2021 | Hsieh et al. | |
| 2022/0260630 A1 | 8/2022 | Fayneh et al. | |
| 2022/0349935 A1 | 11/2022 | Fayneh et al. | |
| 2022/0349938 A1 | 11/2022 | Vezyrtzis et al. | |
| 2023/0098071 A1 | 3/2023 | Chonnad et al. | |

FOREIGN PATENT DOCUMENTS

| | | |
|---|---|---|
| CN | 101241429 A | 8/2008 |
| CN | 101344898 A | 1/2009 |
| CN | 101915625 B | 7/2012 |
| CN | 102273077 B | 9/2014 |
| CN | 102422169 A | 11/2014 |
| CN | 105210188 A | 12/2015 |
| CN | 106959400 A | 7/2017 |
| CN | 108534866 A | 9/2018 |
| CN | 113466670 A | 10/2021 |
| DE | 102007002253 A1 | 7/2007 |
| DE | 102014216786 B3 | 10/2015 |
| DE | 102012219971 A1 | 7/2016 |
| EP | 962991 A1 | 12/1999 |
| EP | 1262755 A1 | 12/2002 |
| EP | 2006784 A1 | 12/2008 |
| EP | 2060924 A1 | 5/2009 |
| EP | 2413150 A1 | 2/2012 |
| EP | 2770313 A1 | 8/2014 |
| JP | S57116228 A | 7/1982 |
| JP | 2000215693 A | 8/2000 |
| JP | 2002243800 A | 8/2002 |
| JP | 2008147245 A | 6/2008 |
| JP | 2009065533 A | 3/2009 |
| JP | 2009074921 A | 4/2009 |
| JP | 2011204328 A | 10/2011 |
| JP | 2012037238 A | 2/2012 |
| JP | 2012088322 A | 5/2012 |
| JP | 2009021348 A | 7/2013 |
| JP | 2014085348 A | 5/2014 |
| JP | 2016111563 A | 6/2016 |
| KR | 101232207 B1 | 2/2013 |
| KR | 2013110989 A | 10/2013 |
| KR | 20150073199 A | 6/2015 |
| TW | 200914841 A | 4/2009 |
| TW | 201614256 A | 3/2016 |
| TW | 201709669 A | 3/2017 |
| WO | 2005080099 A1 | 9/2005 |
| WO | 2013070218 A1 | 5/2013 |
| WO | 2013027739 A1 | 3/2015 |
| WO | 2019097516 A1 | 5/2019 |
| WO | 2019102467 A1 | 5/2019 |
| WO | 2019135247 A1 | 7/2019 |
| WO | 2019202595 A1 | 10/2019 |
| WO | 2019244154 A1 | 12/2019 |
| WO | 2020141516 A1 | 7/2020 |
| WO | 2020230130 A1 | 11/2020 |
| WO | 2021019539 A1 | 2/2021 |
| WO | 2021111444 A1 | 6/2021 |
| WO | 2021214562 A1 | 10/2021 |
| WO | 2022/009199 A1 | 1/2022 |
| WO | 2022215076 A1 | 10/2022 |
| WO | 2023238128 A1 | 12/2023 |
| WO | 2024/166103 A1 | 8/2024 |
| WO | 2025146691 A1 | 7/2025 |

OTHER PUBLICATIONS

Kan Takeuchi et al; "Wear-out stress monitor utilising temperature and voltage sensitive ring oscillators" IET Circuits, Devices & Systems. vol. 12 No. 2, pp. 182-188, Jan. 15, 2018. doi: 10.1049/iet-cds.2017.0153.

Kan Takeuchi et al; "Experimental Implementation of 8.9Kgate Stress Monitor in 28nm MCU along with Safety Software Library for IoT Device Maintenance"; IEEE International Reliability Physics Symposium (IRPS). Mar. 31, 2019. doi: 10.1109/IRPS.2019.8720583.

Dan Ernst et al; "Razor: circuit-level correction of timing errors for low-power operation," in IEEE Micro, vol. 24, No. 6, pp. 10-20, Nov.-Dec. 2004, doi: 10.1109/MM.2004.85.

Dan Ernst et al; "Razor: A Low-Power Pipeline Based on Circuit-Level Timing Speculation"; Appears in the 36th Annual International Symposium on Microarchitecture (MICRO-36). Dec. 1, 2003. San Diego, CA, USA, 2003, pp. 7-18, doi: 10.1109/MICRO.2003.1253179.

James P. Hofmeister, et al, "Ball Grid Array (BGA) Solder Joint Intermittency Detection: SJ BIST™", IEEE Aerospace Conference Proceedings, Apr. 2008, paper #1148, Version 1. doi: 10.1109/AERO.2008.4526624.

Paulheim H, Meusel R. "A decomposition of the outlier detection problem into a set of supervised learning problems", Machine Learning, Sep. 2015, vol. 100 Issue 2, pp. 509-531. DOI 10.1007/s10994-015-5507-y.

Zhang L, Marron JS, Shen H, Zhu Z., "Singular value decomposition and its visualization", Journal of Computational and Graphical

(56) References Cited

OTHER PUBLICATIONS

Statistics, Dec. 2007, vol. 6 Issue 4, pp. 833-854. DOI: 10.1198/106186007X256080.

Shinkai, Ken-ichi et al. "Device-parameter estimation with on-chip variation sensors considering random variability."; In 16th Asia and South Pacific Design Automation Conference (ASP-DAC 2011), pp. 683-688. IEEE, Jan. 25, 2011. doi: 10.1109/ASPDAC.2011.5722274.

Weiwei Shan et al. "An improved timing error prediction monitor for wide adaptive frequency scaling"; IEICE Electronics Express, vol. 14, No. 21, pp. 1-6, Oct. 20, 2017. DOI: 10.1587/elex.14.20170808.

Agilent Technologies; "Clock Jitter Analysis with femto-second resolution"; Jan. 1, 2008.

Yousuke Miyake et al; "Temperature and voltage estimation using ring-oscillator-based monitor for field test"; IEEE 23rd Asian Test Symposium; pp. 156-161, Nov. 16, 2014. doi: 10.1109/ATS.2014.38.

Basab Datta at al; "Analysis of A Ring Oscillator Based on Chip Thermal Sensor in 65nm Technology"; Online at: https://web.archive.org/web/20140328234617/http://www-unix.ecs.umass.edu/~dkumar/lab4_658_report/lab4_report.htm; Sep. 5, 2018.

Tilman Wolf et al; "Collaborative Monitors for Embedded System Security". Jan. 1, 2006. First Workshop on Embedded System Security in conjunction with EMSOFT '06, Oct. 26, 2006, Seoul, South Korea.

Sandeep Kumar Samal et al; "Machine Learning Based Variation Modeling and Optimization for 3D ICs"; J. Inf. Commun. Converg. Eng. 14(4): 258-267, Dec. 2016. DOI: 10.6109/jicce.2016.14.4.258.

Yin-Nien Chen et al; "Impacts of Work Function Variation and Line-Edge Roughness on TFET and FinFET Devices and 32-Bit CLA Circuits"; J. Low Power Electron. Appl. 2015, 5, 101-115. May 21, 2015. doi: 10.3390/jlpea5020101.

Yong Zhao et al; "A Genetic Algorithm Based Remaining Lifetime Prediction for a VLIW Processor Employing Path Delay and IDDX Testing"; IEEE; Apr. 12, 2016. IEEE; Apr. 12, 2016. 2016 11th International Conference on Design and Technology of Integrated Systems in Nanoscale Era (DTIS), Istanbul, Turkey, 2016, pp. 1-4, doi: 10.1109/DTIS.2016.7483805.

Vivek S Nandakumar et al, "Statistical static timing analysis flow for transistor level macros in a microprocessor"; 2010, 11th International Symposium on Quality Electronic Design (ISQED), pp. 163-170, Mar. 22, 2010. doi: 10.1109/ISQED.2010.5450412.

Jing Li et al, "Variation Estimation and Compensation Technique in Scaled LTPS TFT Circuits for Low-Power Low-Cost Applications"; IEEE Transactions on Computer-Aided Design of Integrated Circuits and Systems, vol. 28(1): 46-59, Jan. 1, 2009. doi: 10.1109/TCAD.2008.2009149.

Xie Qing et al "Variation-Aware Joint Optimization of the Supply Voltage and Sleep Transistor Size for 7nm FinFET Technology"; 2014 IEEE 32nd international conference on computer design, pp. 380-385, Oct. 19, 2014. doi: 10.1109/ICCD.2014.6974709.

Rebaud B et al , "Timing slack monitoring under process and environmental variations: Application to a DSP performance optimization"; Microelectronics Journal vol. 42 Issue 5, pp. 718-732, Feb. 8, 2011. doi: 10.1016/j.mejo.2011.02.005.

Dierickx B et al, "Propagating variability from technology to system Level"; Physics of Semiconductor Devices, pp. 74-79, Dec. 16, 2007. doi: 10.1109/IWPSD.2007.4472457.

Zheng K., "A Comparison of Digital Droop Detection Techniques in ASAP7 FinFET"; Research Review. Sep. 2019.

Hongge Chen, "Novel Machine Learning Approaches for Modeling Variations in Semiconductor Manufacturing," Master thesis, Jun. 2017.

Nidhal Selmane, Shivam Bhasin, Sylvain Guilley, Tarik Graba, Jean-Luc Danger. "WDDL is Protected Against Setup Time Violation Attacks." CHES, Sep. 2009, Lausanne, Switzerland. pp.73-83. doi: 10.1109/FDTC.2009.40.

Nidhal Selmane, Shivam Bhasin, Sylvain Guilley, Jean-Luc Danger. "Security evaluation of application-specific integrated circuits and field programmable gate arrays against setup time violation attacks." IET Inf. Secur., 2011, vol. 5, Iss. 4, pp. 181-190. doi: 10.1049/iet-ifs.2010.0238.

Jianfeng Zhang et al, "Parameter Variation Sensing and Estimation in Nanoscale Fabrics"; Journal of Parallel and Distributed Computing; vol. 74, Issue 6, pp. 2504-2511, Jun. 1, 2014. https://doi.org/10.1016/j.jpdc.2013.08.005.

I. A. K. M. Mahfuzul et al, "Variation-sensitive monitor circuits for estimation of Die-to-Die process variation"; 2011 IEEE ICMTS International Conference on Microelectronic Test Structures; pp. 153-157, Apr. 4-7, 2011. doi: 10.1109/ICMTS.2011.5976878.

Ying Qiao et al, "Variability-aware compact modeling and statistical circuit validation on SRAM test array"; Proceedings vol. 9781, Design-Process-Technology Co-optimization for Manufacturability X, Mar. 16, 2016. https://doi.org/10.1117/12.2219428.

David Herres, "The Eye Diagram: What is it and why is it used?"; Online at: https://www.testandmeasurementtips.com/basics-eye-diagrams/, Aug. 16, 2016.

Yu-Chuan Lin et al, "A 10-GB/s Eye-Opening Monitor Circuit for Receiver Equalizer Adaptations in 65-nm CMOS;" in IEEE Transactions on Very Large Scale Integration (VLSI) Systems, vol. 28, No. 1, pp. 23-34, Jan. 2020. doi: 10.1109/TVLSI.2019.2935305.

PCT International Search Report for International Application No. PCT/IL2022/050363, mailed Aug. 29, 2022, 5pp.

PCT Written Opinion for International Application No. PCT/IL2022/050363, mailed Aug. 29, 2022, 6pp.

Mridul Agarwal et al., "Circuit Failure Prediction and Its Application to Transistor Aging"; 5th IEEE VLSI Test Symposium (VTS'07), pp. 277-286, May 6-10, 2007. doi: 10.1109/VTS.2007.22.

Keith A. Bowman et al, "Energy-Efficient and Metastability-Immune Resilient Circuits for Dynamic Variation Tolerance"; IEEE Journal of Solid-State Circuits vol. 44, Issue 1, pp. 49-63, Jan. 2009. doi: 10.1109/JSSC.2008.2007148.

Shidhartha Das et al, "A Self-Tuning DVS Processor Using Delay-Error Detection and Correction"; IEEE Journal of Solid-State Circuits; vol. 41, Issue 4, pp. 792-804, Apr. 2006. doi: 10.1109/JSSC.2006.870912.

Shidhartha Das et al, "RazorII: In Situ Error Detection and Correction for PVT and SER Tolerance" 2008 IEEE International Solid-State Circuits Conference—Digest of Technical Papers, Feb. 3-7, 2008. doi: 10.1109/JSSC.2008.2007145.

Ramyanshu Datta et al, "On-Chip Delay Measurement for Silicon Debug"; GLSVLSI '04: Proceedings of the 14th ACM Great Lakes symposium on VLSI; pp. 145-148, Apr. 26-28, 2004. https://doi.org/10.1145/988952.988988.

Alan Drake et al, "A Distributed Critical-Path Timing Monitor for a 65nm High-Performance Microprocessor"; 2007 IEEE International Solid-State Circuits Conference. Digest of Technical Papers; Feb. 11-15, 2007. doi: 10.1109/ISSCC.2007.373462.

Matthias Eireiner et al, "In-Situ Delay Characterization and Local Supply Voltage Adjustment for Compensation of Local Parametric Variations"; IEEE Journal of Solid-State Circuits; vol. 42, Issue 7, pp. 1583-1592, Jul. 2007. doi: 10.1109/JSSC.2007.896695.

Matthew Fojtik et al, "Bubble Razor: An architecture-independent approach to timing-error detection and correction"; 2012 IEEE International Solid-State Circuits Conference; Feb. 19-23, 2012. doi: 10.1109/ISSCC.2012.6177103.

Matthew Fojtik et al., "Bubble Razor: Eliminating Timing Margins in an ARM Cortex-M3 Processor in 45 nm CMOS Using Architecturally Independent Error Detection and Correction"; IEEE Journal of Solid-State Circuits; vol. 48, Issue 1, pp. 66-81, Jan. 2013. doi: 10.1109/JSSC.2012.2220912.

Piero Franco et al, "On-Line Delay Testing of Digital Circuits"; Proceedings of IEEE VLSI Test Symposium; Apr. 25-28, 1994. pp. 167-173, doi: 10.1109/VTEST.1994.292318.

V. Huard et al, "Adaptive Wearout Management with in-situ aging monitors"; 2014 IEEE International Reliability Physics Symposium; Jun. 1-5, 2014. pp. 6B.4.1-6B.4.11, doi: 10.1109/IRPS.2014.6861106.

Liangzhen Lai et al, "SlackProbe: A Flexible and Efficient In Situ Timing Slack Monitoring Methodology"; IEEE Transactions on

(56) References Cited

OTHER PUBLICATIONS

Computer-Aided Design of Integrated Circuits and Systems; vol. 33, Issue 8, pp. 1168-1179, Aug. 2014. doi: 10.1109/TCAD.2014.2323195.

M. Saliva et al, "Digital Circuits Reliability with In-Situ Monitors in 28nm Fully Depleted SOI"; 2015 Design, Automation Mar. 9-13, 2015. doi: 10.7873/DATE.2015.0238.

Martin Wirnshofer et al, "A Variation-Aware Adaptive Voltage Scaling Technique based on In-Situ Delay Monitoring"; 14th IEEE International Symposium on Design and Diagnostics of Electronic Circuits and Systems; pp. 261-266, Apr. 13-15, 2011. doi: 10.1109/DDECS.2011.5783090.

Martin Wirnshofer et al, "An Energy-Efficient Supply Voltage Scheme using In-Situ Pre-Error Detection for on-the-fly Voltage Adaptation to PVT Variations"; 2011 International Symposium on Integrated Circuits; pp. 94-97, Dec. 12-14, 2011. doi: 10.1109/ISICir.2011.6131888.

Martin Wirnshofer et al, "On-line supply voltage scaling based on in situ delay monitoring to adapt for PVTA variations"; Journal of Circuits, Systems and Computers; vol. 21, No. 08, Mar. 7, 2012. doi: 10.1142/S0218126612400270.

S. Mhira et al, "Dynamic Adaptive Voltage Scaling in Automotive environment"; 2017 IEEE International Reliability Physics Symposium (IRPS); p. 3A-4.1-3A-4.7, Apr. 2-6, 2017. doi: 10.1109/IRPS.2017.7936279.

A. Benhassain et al, "Early failure prediction by using in-situ monitors: Implementation and application results"; Online at: https://ceur-ws.org/Vol-1566/Paper6.pdf, Mar. 18, 2016.

Charles R. Lefurgy et al, "Active Management of Timing Guardband to Save Energy in POWER7"; 2011 44th Annual IEEE/ACM International Symposium on Microarchitecture (MICRO); pp. 1-11; Dec. 3-7, 2011.

C. R. Lefurgy et al., "Active Guardband Management in Power7+ to Save Energy and Maintain Reliability"; in IEEE Micro, vol. 33, No. 4, pp. 35-45, Jul.-Aug. 2013. doi: 10.1109/MM.2013.52.

B. Zandian et al, "Cross-layer resilience using wearout aware design flow"; 2011 IEEE/IFIP 41st International Conference on Dependable Systems & Networks (DSN), pp. 279-290, Jun. 27-30, 2011. doi: 10.1109/DSN.2011.5958226.

M. Cho et al., "Postsilicon Voltage Guard-Band Reduction in a 22 nm Graphics Execution Core Using Adaptive Voltage Scaling and Dynamic Power Gating"; in IEEE Journal of Solid-State Circuits, vol. 52, No. 1, pp. 50-63, Jan. 4, 2017. doi: 10.1109/JSSC.2016.2601319.

W. Shan et al, "Timing error prediction based adaptive voltage scaling for dynamic variation tolerance"; 2014 IEEE Asia Pacific Conference on Circuits and Systems (APCCAS), pp. 739-742, Nov. 17-20, 2014. doi: 10.1109/APCCAS.2014.7032887.

J. Li et al, "Robust and in-situ self-testing technique for monitoring device aging effects in pipeline circuits"; 2014 51st ACM/EDAC/IEEE Design Automation Conference (DAC), pp. 1-6, Jun. 1-5, 2014.

X. Shang et al, "A 0.44V-1.1V 9-transistor transition-detector and half-path error detection technique for low power applications"; 2017 IEEE Asian Solid-State Circuits Conference (A-SSCC), pp. 205-208, Nov. 6-8, 2017. doi: 10.1109/ASSCC.2017.8240252.

Liangzhen Lai et al, "Accurate and inexpensive performance monitoring for variability-aware systems"; 2014 19th Asia and South Pacific Design Automation Conference (ASP-DAC), pp. 467-473, Jan. 20-23, 2014. doi: 10.1109/ASPDAC.2014.6742935.

Martin Wirnshofer et al, "Adaptive voltage scaling by in-situ delay monitoring for an image processing circuit"; 2012 IEEE 15th International Symposium on Design and Diagnostics of Electronic Circuits & Systems (DDECS), pp. 205-208, Apr. 18-20, 2012. doi: 10.1109/DDECS.2012.6219058.

Youhua Shi et al, "Suspicious timing error prediction with in-cycle clock gating"; International Symposium on Quality Electronic Design (ISQED), pp. 335-340, Mar. 4-6, 2013. doi: 10.1109/ISQED.2013.6523631.

Youhua Shi et al, "In-situ timing monitoring methods for variation-resilient designs"; 2014 IEEE Asia Pacific Conference on Circuits and Systems (APCCAS), pp. 735-738, Nov. 17-20, 2014. doi: 10.1109/APCCAS.2014.7032886.

Jongho Kim et al., "Adaptive delay monitoring for wide voltage-range operation"; 2016 Design, Automation & Test in Europe Conference & Exhibition (DATE), pp. 511-516, Mar. 14-18, 2016. DOI: 10.3850/9783981537079_0330.

Xiaobin Yuan et al., "Design Considerations for Reconfigurable Delay Circuit to Emulate System Critical Paths"; in IEEE Transactions on Very Large Scale Integration (VLSI) Systems, vol. 23, No. 11, pp. 2714-2718, Nov. 2015. doi: 10.1109/TVLSI.2014.2364785.

Borivoje Nikolic et al, "Technology Variability From A design Perspective"; IEEE Transactions on Circuits and Systems I: Regular Papers; vol. 58, Issue: 9, pp. 1996-2009, Sep. 8, 2011. pp. 1996-2009, Sep. 2011, doi: 10.1109/TCSI.2011.2165389.

Tamas Virosztek, "Maximum likelihood estimation of ADC parameters"; [M. Sc. Thesis; Budapest University of Technology and Economics], pp. 1-67, Dec. 19, 2013.

\* cited by examiner

ADAPTIVE FREQUENCY SCALING BASED ON CLOCK CYCLE TIME MEASUREMENT

CROSS-REFERENCE TO RELATED APPLICATIONS

This application is a National Phase of PCT Patent Application No. PCT/IL2022/050363 having International filing date of Apr. 7, 2022, which claims priority to U.S. Provisional Patent Application No. 63/171,622, filed Apr. 7, 2021, entitled "Adaptive Frequency Scaling Based On Clock Cycle Time Measurement."

FIELD OF THE INVENTION

The invention relates to the field of integrated circuits.

BACKGROUND

Integrated circuits (ICs) may include analog and digital electronic circuits on a flat semiconductor substrate, such as a silicon wafer. Microscopic transistors are printed onto the substrate using photolithography techniques to produce complex circuits of billions of transistors in a very small area, making modern electronic circuit design using ICs both low cost and high performance. ICs are produced in assembly lines of factories, termed foundries, which have commoditized the production of ICs, such as complementary metal-oxide-semiconductor (CMOS) ICs. Digital ICs contain billions of transistors arranged in functional and/or logical units on the wafer, and are packaged in a metal, plastic, glass, or ceramic casing. The casing, or package, is connected to a circuit board, such as by using solder. Types of packages may include a leadframe (though-hole, surface mount, chip-carrier, and/or the like), pin grid array, chip scale package, ball grid array, and/or the like, to connect between the IC pads and the circuit board. As used herein, the term IC means the integrated circuit including the package.

Semiconductor ICs use synchronous digital logic, controlled by a clock signal. The clock signal is generated on the Semiconductor IC. Various factors can lead to the clock frequency changing. Adaptive Frequency Scaling (AFS) is known for control of the clock frequency. Controlling AFS operation is desirable for optimal performance of the semiconductor IC.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods, which are meant to be exemplary and illustrative, not limiting in scope.

In an embodiment, there is provided a controller for generation of a clock signal in a semiconductor integrated circuit (IC), the controller comprising: a Noise Modulation Agent (NMA), configured to measure the clock signal and output a parameter indicative of an effective cycle time of the clock signal; and an Adaptive Frequency Scaling (AFS) circuit, configured selectively to adjust a frequency of the clock signal based on the output of the NMA indicating a change in a power supply voltage of the semiconductor IC.

In embodiments, the AFS circuit is configured to activate adjusting a frequency of the clock signal if the output of the NMA descends below a first threshold. In embodiments, the AFS circuit is configured to deactivate adjusting a frequency of the clock signal if the output of the NMA rises above a second threshold, the second threshold being higher than the first threshold.

In embodiments, the AFS circuit is configured, when activated, to reduce the frequency of the clock signal in response to the output of the NMA indicating a reduction in the effective cycle time of the clock signal.

In embodiments, the NMA comprises: a time-to-digital converter, arranged to output a measurement of a cycle time of an input clock signal, the parameter indicative of an effective cycle time of the clock signal being based on the measurement output of the time-to-digital converter. In embodiments, the time-to-digital converter comprises a tapped delay line. In embodiments, the NMA further comprises: an input, arranged to receive the clock signal; a clock divider, configured to divide the received clock signal and provide a divided clock signal; a calibration buffer, configured to adjust the divided clock signal, the input clock signal of the time-to-digital converter being the adjusted divided clock signal; and NMA processing logic, configured to receive the measurement output from the time-to-digital converter and generate the parameter indicative of an effective cycle time of the clock signal.

In embodiments, the AFS circuit comprises: a supply pin voltage input, arranged to receive a supply pin voltage for the IC; a filter, configured to process the received supply pin voltage and generate a PLL filter input for input to a phase-locked loop (PLL) of a clock generator; and AFS processing logic, configured to receive the output of the NMA and, in response to the received output of the NMA, control the PLL output. In embodiments, the PLL filter input is provided as an input to the PLL for summation with an output of a low pass filter of the PLL and/or as a component of an input to a signal generator of the PLL.

In embodiments, the AFS circuit comprises: AFS processing logic, comprising clock selection logic configured to select from one of a plurality of clock generator circuits, each clock generator circuit being configured to generate a clock signal of a respective, different frequency, the clock signal generated by the selected clock generator circuit providing the clock signal in the semiconductor IC.

In embodiments, the AFS processing logic is configured to control activation of the PLL filter input or clock selection logic and/or adjust the PLL filter input or clock selection logic, in response to the received output of the NMA.

According to further embodiments, there may be provided a semiconductor integrated circuit (IC) comprising a clock generation circuit and a controller for generation of a clock signal as herein disclosed.

In accordance with other embodiments, there is provided a method for generating a clock signal in a semiconductor integrated circuit (IC), the method comprising: measuring the clock signal to provide a parameter indicative of an effective cycle time of the clock signal; and selectively adjusting a frequency of the clock signal based on the parameter indicative of the effective cycle time of the clock signal, using an Adaptive Frequency Scaling (AFS) circuit.

In embodiments, the method further comprises activating adjusting or switching a frequency of the clock signal if the parameter indicative of the effective cycle time of the clock signal descends below a first threshold. In embodiments, the method further comprises deactivating adjusting or switching a frequency of the clock signal if the parameter indicative of the effective cycle time of the clock signal rises above a second threshold, the second threshold being higher than the first threshold.

In embodiments, the method further comprises: when the AFS circuit is activated, reducing the frequency of the clock signal in response to the parameter indicative of the effective cycle time of the clock signal indicating a reduction in the effective cycle time of the clock signal.

In embodiments, the step of measuring the clock signal to provide a parameter indicative of an effective cycle time of the clock signal is performed by a Noise Modulation Agent (NMA), the parameter indicative of the effective cycle time of the clock signal being an output of the NMA.

In embodiments, the NMA comprises a time-to-digital converter, arranged to output a measurement of a cycle time of an input clock signal, the parameter indicative of an effective cycle time of the clock signal being based on the measurement output of the time-to-digital converter. In embodiments, the method further comprises: receiving the clock signal at the NMA; dividing the received clock signal to provide a divided clock signal; adjusting the divided clock signal using a calibration buffer; measuring a cycle time of the adjusted divided clock signal at the time-to-digital converter; and generating the parameter indicative of an effective cycle time of the clock signal using the measurement output from the time-to-digital converter.

In embodiments, the method further comprises: receiving a supply pin voltage for the IC; processing the received supply pin voltage at a filter and generating a PLL filter input for input to a phase-locked loop (PLL) of a clock generator; and receiving the parameter indicative of the effective cycle time of the clock signal and, in response to the received parameter indicative of the effective cycle time of the clock signal, controlling the PLL output.

In embodiments, the method further comprises: selecting from one of a plurality of clock generator circuits, each clock generator circuit being configured to generate a clock signal of a respective, different frequency, the clock signal generated by the selected clock generator circuit providing the clock signal in the semiconductor IC.

In embodiments, the method further comprises controlling activation of the PLL filter input or the step of selecting and/or adjusting the PLL filter input or the step of selecting, in response to the received parameter indicative of the effective cycle time of the clock signal.

In addition to the exemplary aspects and embodiments described above, further aspects and embodiments will become apparent by reference to the figures and by study of the following detailed description. The skilled person will appreciate that combinations and sub-combinations of specific features disclosed herein may also be provided, even if not explicitly described.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are devices, systems, and methods to control generation of a clock signal in a semiconductor integrated circuit (IC). Noise may cause a droop in the power supply pin voltage (VDD) of the semiconductor IC. VDD droop may then lead to clock frequency reduction. Adaptive Frequency Scaling (AFS) is able to control the clock frequency and, in response to detection of a VDD droop, maintain the clock frequency at the desired level.

A Noise Modulation Agent (NMA) can be used to measure an effective cycle time of the clock signal. It has been found by the inventors that an output of the NMA can indicate VDD droop. Using this output to control VDD operation can therefore advantageously provide improved AFS operation and better clock frequency control.

Figure 1:
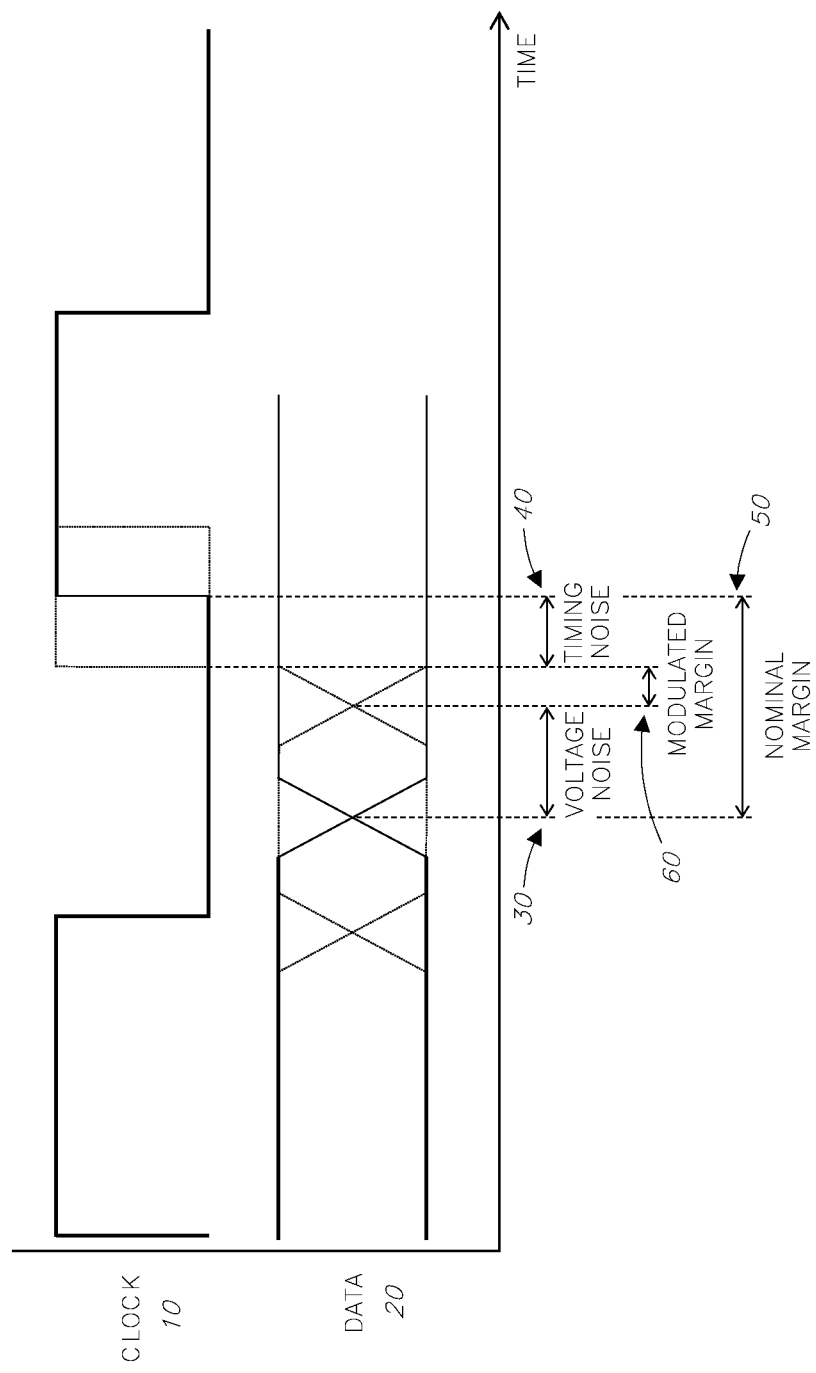
FIG. 1 shows example clock and data waveforms from a semiconductor IC, showing margins due to noise.

Reference is made to FIG. 1, which shows an example clock waveform 10, having a cycle period ($T_{cyc}$) and an example data waveform 20 from a semiconductor IC, showing margins due to noise. Changes in the data waveform 20 typically occur at clock signal edges, as illustrated. A logic path within the semiconductor IC, for example resulting in data waveform 20, is designed to meet a certain clock cycle time. For example, if a certain logic path should be run at a clock signal of frequency 1 GHz, the propagation delay (P_delay) of the logic path (assuming it is a critical path) should be no more than 1 nanosecond (less any flip-flop setup time, Setup_time) to avoid a timing error. The time duration between a change in the data waveform 20 and the next rising edge of the clock waveform 10 may be termed a "margin." This provides a quantitative expression of how well the designed propagation delay is being met.

The above discussion represents an ideal case, that is, where there is substantially no noise in the system. In a real system, the propagation delay (P_delay) is affected by the noise. As a result, the margin to failure (M) is also affected: $M = T_{cyc} - P\_delay - Setup\_time$. The margin (M) is typically affected by one or both of two noise sources: power supply noise, represented by voltage noise 30 and causing noise in the data waveform 20; and/or clock jitter, represented by timing noise 40, causing noise in the clock signal edges and thereby affecting the clock frequency.

A nominal margin 50 may therefore be considered based on the duration between an average time for a change in the data waveform 20 and an average time for a next rising edge of the clock waveform 10. A modulated margin 60 may be considered based on the duration between a latest time for a change in the data waveform 20 (due to voltage noise 30) and an earliest time for a next rising edge of the clock waveform 10 (due to timing noise 40—a Gaussian timing noise illustrated on both sides of the rising clock edge, but only the maximum of its negative amplitude should be taken into account). The effective cycle time for the clock signal may therefore be considered the nominal or average cycle time subtracted by the modulated margin 60. For example, a logic path may be designed to meet a clock cycle time of 1 ns at a VDD of nominal amplitude (VDD-nom). If the voltage noise level is −20 mV, the propagation delay of the path will increase, so in order to meet a setup time of a sampling flip-flop at the end of the logic path, the cycle time should be effectively increased. In other words, the effective cycle time of a logic block may be considered equivalent to the minimum operational cycle time (or conversely, the time corresponding with the maximum operational frequency) of a logic system, considering voltage noise and clock jitter.

Figure 2:
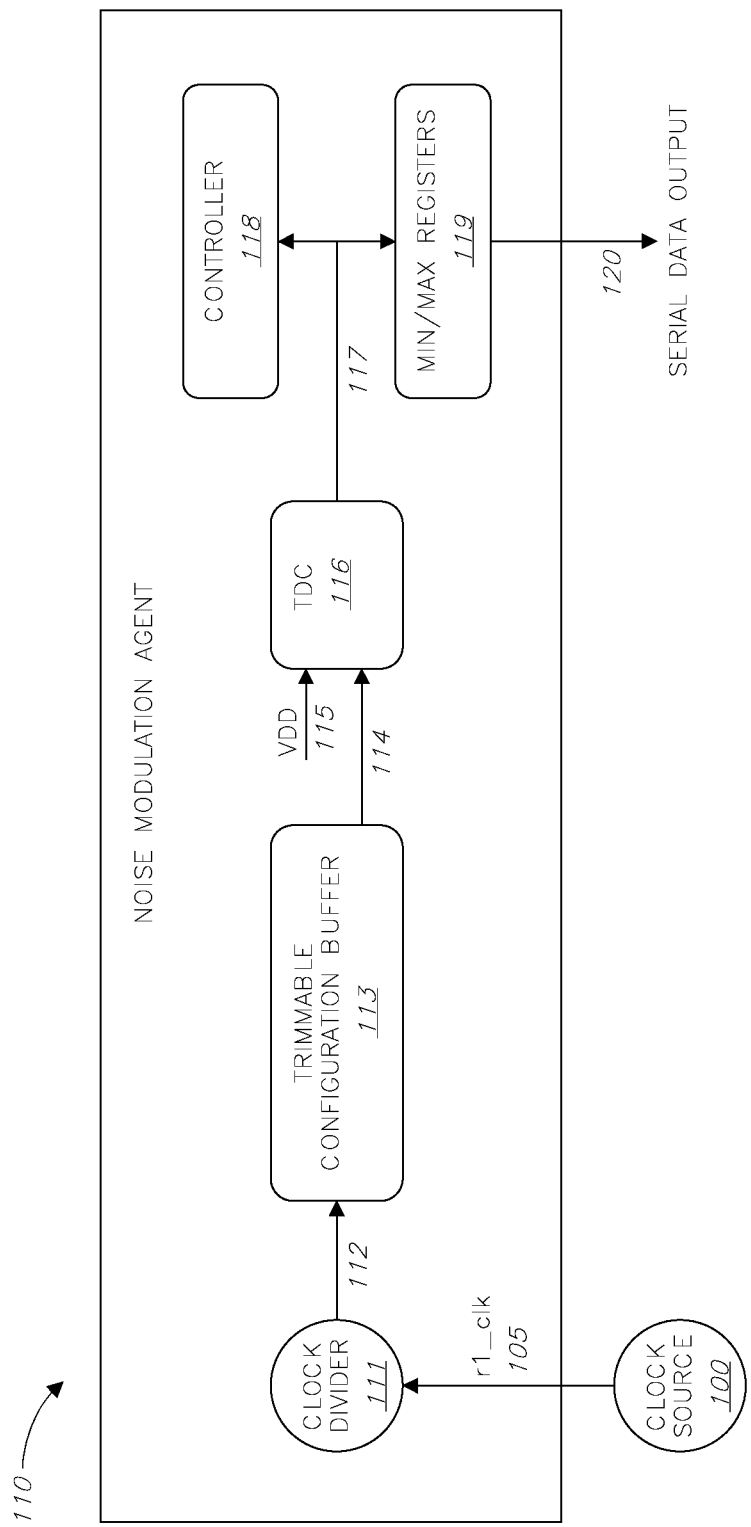
FIG. 2 schematically illustrates an example Noise Modulation Agent (NMA).

The effective cycle time can be measured by a NMA. With reference to FIG. 2, there is schematically illustrated an example NMA 110. The NMA 110 comprises: a clock divider 111; a trimmable calibration buffer 113; a time-to-digital converter (TDC) 116; a controller 118; and registers for determining minimum and/or maximum values 119. A clock source 100 provides a clock signal 105 (r1_clk) to the clock divider 111, which provides a divided clock signal 112. Typically, the clock signal 105 is divided by 2, only when clock source is between 2 GHz and 4 GHz.

The divided clock signal 112 is provided as an input to the trimmable calibration buffer 113, which is controlled by the controller 118. The trimmable calibration buffer 113 adjusts the divided clock signal 112 and provides an adjusted divided clock signal 114 to the TDC 116. The TDC also receives the IC supply pin voltage (VDD) 115 and provides a digital time output 117 to the controller 118 and to the registers 119. The registers also receive the divided clock signal 112. The digital time output 117 is encoded in an 8-bit register in registers 119 and is ready two clock source cycles after the TDC measurement. The registers 119 provide a serial data output 120 based on the digital time output 117 and the divided clock signal 112. Calibration is carried out every time the NMA starts a measurement (monitoring) period.

As discussed above, noise on the power supply voltage may cause VDD droop. This can be detected by the NMA. For example, consider a clock signal Vclk(t) that has an angular frequency $\omega_0$ and an overlaid noise signal Vn(t)=$V_m$ cos($\omega_m$t). The change in the clock period is given by the following expression:

$$\Delta T_{period} = k \cdot V_m \cdot \frac{\omega_m}{\omega_o} \cdot \cos(\omega_m t).$$

The output of the TDC 116 represents the effective clock cycle time. The TDC 116 uses a tapped delay line with flip-flops arranged at each tap. The effective clock cycle time is determined by a combination of the variation in the clock cycle-time input to the TDC 116 and the impact of the VDD noise on the delay-line of the TDC 116. Therefore, the VDD droop effect due to the noise is indicated by the TDC output. This is discussed further below using an example.

Figure 3:
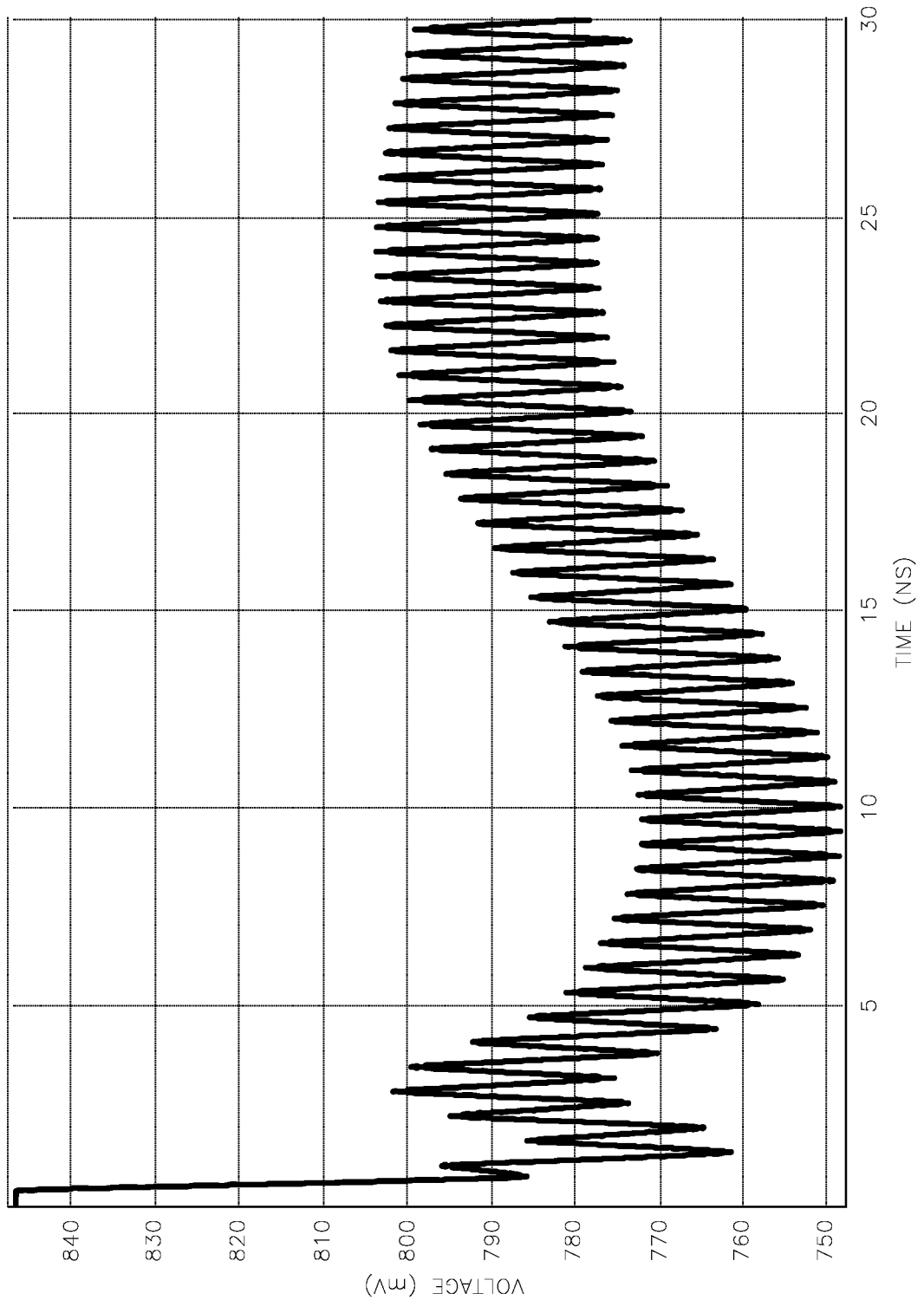
FIG. 3 shows example simulated noise on a power supply pin voltage of a semiconductor IC.

With reference to FIG. 3, there is shown example simulated noise on a power supply pin voltage of a semiconductor IC. This shows the VDD droop effect for a clock signal of frequency 1600 MHZ.

Figure 4A:
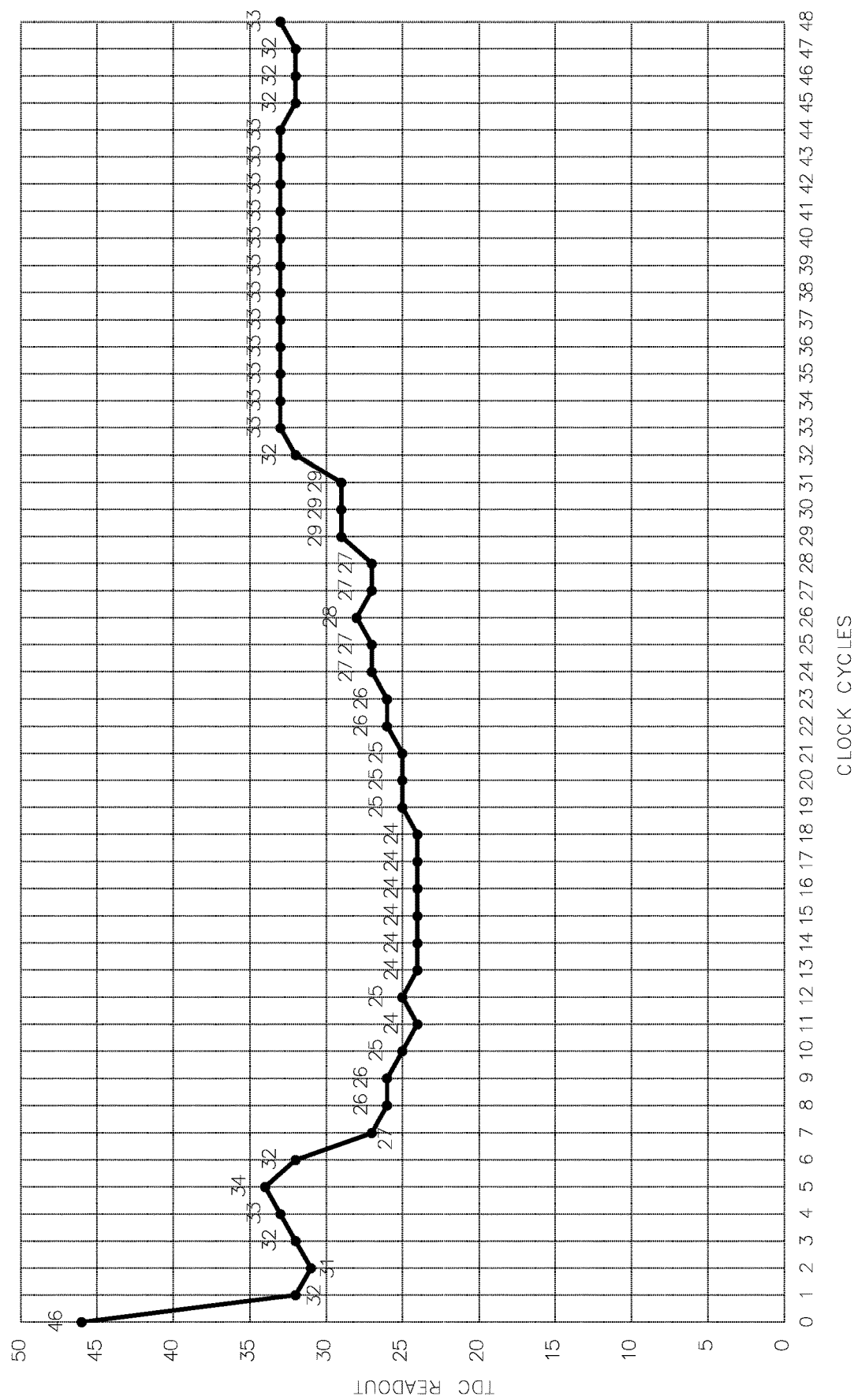
FIG. 4A plots a first example of a readout from a time-to-digital converter of a NMA according to FIG. 2, when measuring a clock signal with noise.
Figure 4B:
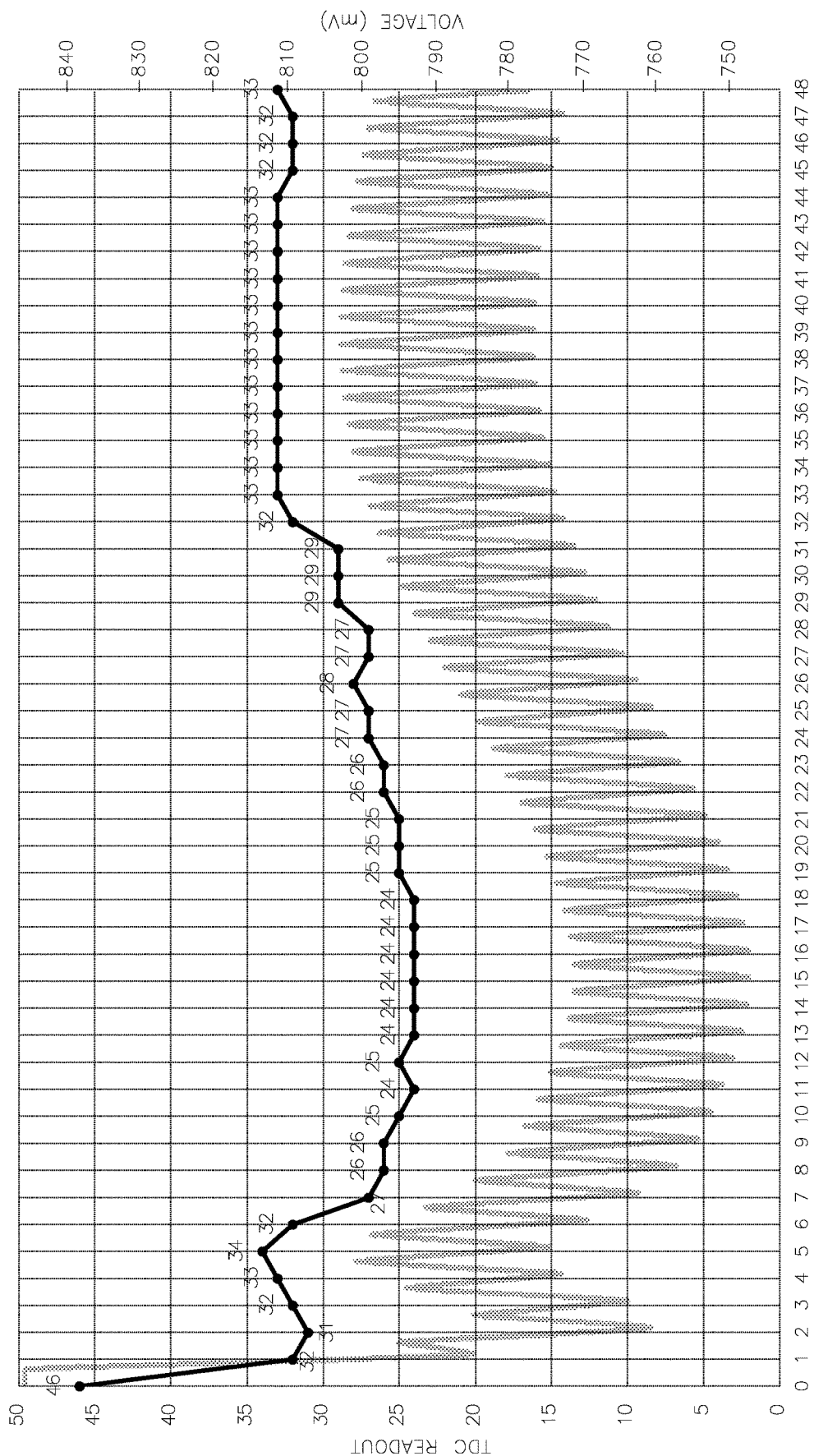
FIG. 4B shows the plot of FIG. 4A overlaid on the simulated noise of FIG. 3, to compare the two.

With reference to FIG. 4A, there is plotted a first example of a readout from a TDC of a NMA according to FIG. 2 when measuring the simulated clock signal with noise of FIG. 3. FIG. 4B, in turn, illustrates the simulated noise of FIG. 2 overlaid on the TDC readouts of FIG. 4B, for comparison. As can be seen, the two correlate: the TDC output drops significantly at the same time as the VDD output, and vice versa. It has therefore been recognized that it would be useful to use the TDC output in controlling the clock frequency. An implementation to effect such control is now discussed.

In general terms, there may be considered a controller for generation of a clock signal in a semiconductor integrated circuit (IC), the controller comprising: a Noise Modulation Agent (NMA), configured to measure the clock signal and output a parameter indicative of an effective cycle time of the clock signal; and an Adaptive Frequency Scaling (AFS) circuit, configured selectively to adjust a frequency of the clock signal, based on the output of the NMA indicating a change in a power supply voltage of the semiconductor IC. In a corresponding aspect, there may be considered a method for generating a clock signal in a semiconductor IC, the method comprising: measuring the clock (in particular, using a NMA) to provide a parameter indicative of an effective cycle time of the clock signal; and selectively adjusting a frequency of the clock signal, based on the parameter indicative of the effective cycle time of the clock signal indicating a change in a power supply voltage of the semiconductor IC, using an AFS circuit. A semiconductor IC comprising a clock generation circuit and a controller for generation of a clock signal according to the present disclosure may further be considered.

Various features may be applicable to any of these aspects. For example, the NMA may comprise a time-to-digital converter (TDC). The TDC may be arranged to output a measurement of a cycle time of an input clock signal, the parameter indicative of an effective cycle time of the clock signal being based on the measurement output of the time-to-digital converter. The TDC may comprise a tapped delay line. The NMA may further comprise: an input, receiving the clock signal; a clock divider, dividing the received clock signal to provide a divided clock signal; a calibration buffer, adjusting the divided clock signal, the input clock signal of the TDC being the adjusted divided clock signal. Advantageously, the NMA also comprises NMA processing logic, receiving the measurement output from the TDC and generating the parameter indicative of an effective cycle time of the clock signal. The clock divider and/or the calibration buffer may be omitted, in which case, the input clock signal of the TDC may be the divided clock signal or an adjusted clock signal (an output of the calibration buffer).

Specific details of exemplary implementations will now be discussed and further features according to these general terms will be referenced again subsequently.

Figure 5:
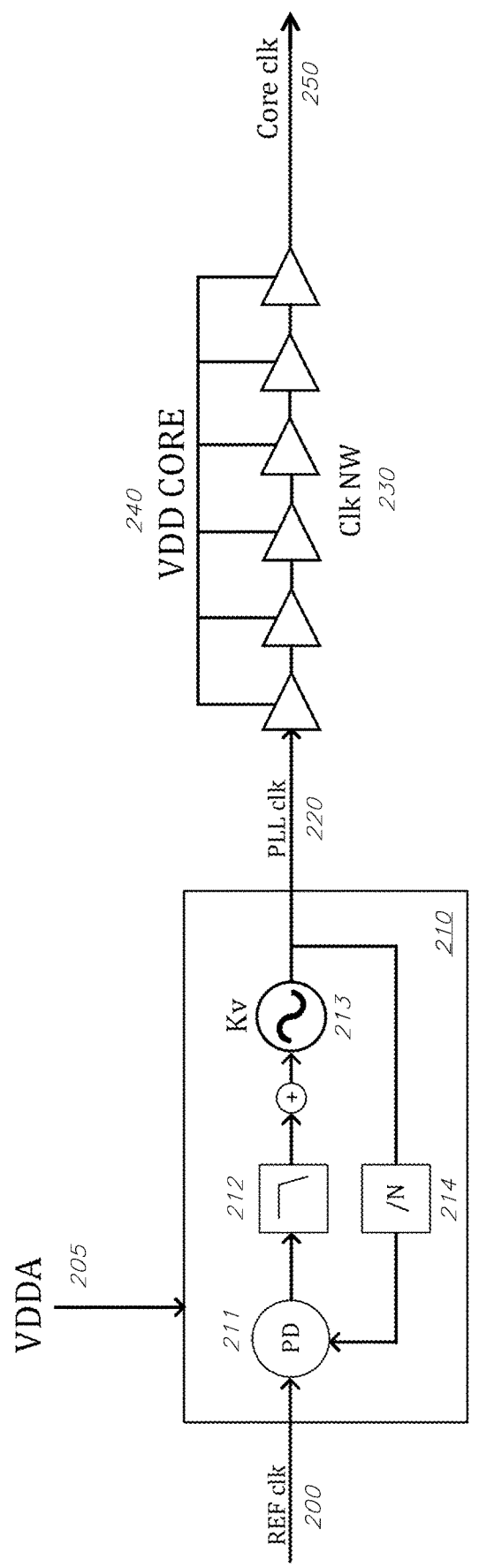
FIG. 5 schematically depicts a typical core clock generation and distribution circuit for a semiconductor IC.

With reference to FIG. 5, there is schematically depicted a typical core clock generation and distribution circuit for a semiconductor IC. This comprises: a Phase-Locked Loop (PLL) clock generator 210; and a clock network 230. The PLL clock generator 210 comprises: a phase detector 211; a low pass filter 212; a voltage controller oscillator (VCO)

213; and a frequency divider 214. The PLL clock generator 210 also receives an Analog Supply Voltage (VDDA) 205. The operation of the PLL clock generator 210 is standard and well understood in the technical field. The phase detector 211 receives a reference clock signal 200 and the output of the frequency divider 214 and generates an error signal that is proportional to the phase difference of these two inputs. That error signal is passed through the low pass filter 212 and the output controls the VCO 213. The output of the VCO 213, which is the PLL clock output 220, is fed back via the frequency divider 214 to the phase detector 211. The PLL clock output 220 is also provided to the clock network 230, which also receives the core supply voltage (VDD Core) 240. The output of the clock network 230 provides a core clock 250.

Figure 6:
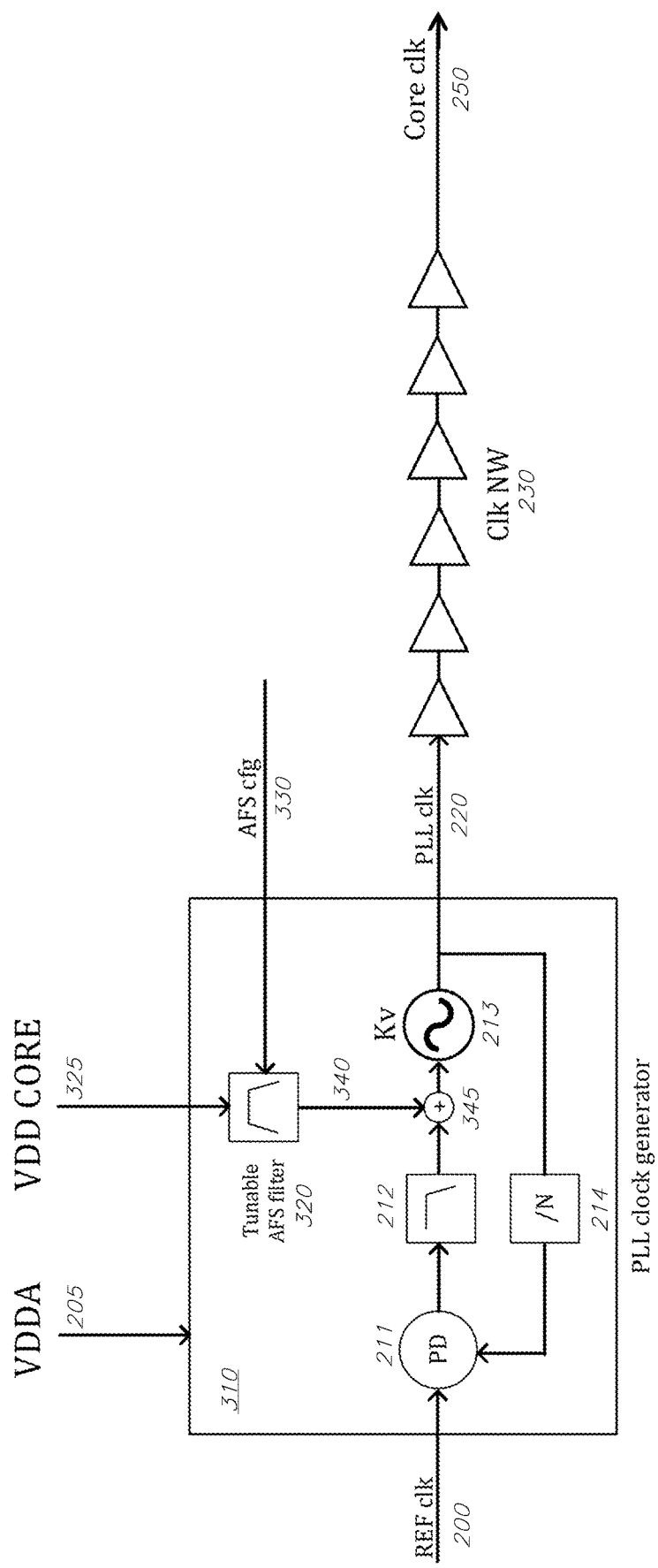
FIG. 6 schematically depicts an example clock generation and distribution circuit for a semiconductor IC with a first implementation of Adaptive Frequency Scaling (AFS).

With reference to FIG. 6, there is schematically depicted an example clock generation and distribution circuit for a semiconductor IC with a first implementation of Adaptive Frequency Scaling (AFS). As discussed above, AFS is used to control the clock frequency and counteract the effects of VDD droop. Where the same features as described in relation to another drawing are shown, identical reference numerals have been used.

The PLL clock generator 310 comprises the same features as the PLL clock generator 210 discussed with reference to FIG. 5. The PLL clock generator 310 additionally includes: a tunable AFS filter 320; and a signal adder 345. The tunable AFS filter 320 receives the VDD core 325 and, based on a AFS configuration input 330, produces an AFS output signal 340. This is added to the output of the low pass filter 212 by the signal adder 345 and the summed output is provided as the input to the VCO 213. When VDD droop is detected, the AFS system is activated. In particular, the AFS system is configured to reduce the clock frequency at least until the transient VDD droop has subsided. The tunable AFS filter 320 may dynamically effect scaling of the core clock 250 to different levels, as required in view of the AFS configuration input 330. The tunable AFS filter 320 may be configured, accordingly, to produce such AFS output signal 340 that effects differing levels of core clock 250 frequency correspondingly to the evolving VDD droop.

Optionally, the tunable AFS filter 320 may be configured, by the AFS configuration input 330, to change its attenuation respective of the incident VDD level. This may be done in a manner which reflects an expected change in sensitivity to VDD noise amplitudes at different VDD levels. For example, the AFS configuration input 330 may configure the tunable AFS filter 320 to perform attenuation to a first, predefined level upon a certain first VDD value, and to attenuate to a second, predefined level upon a certain second VDD value.

Figure 7:
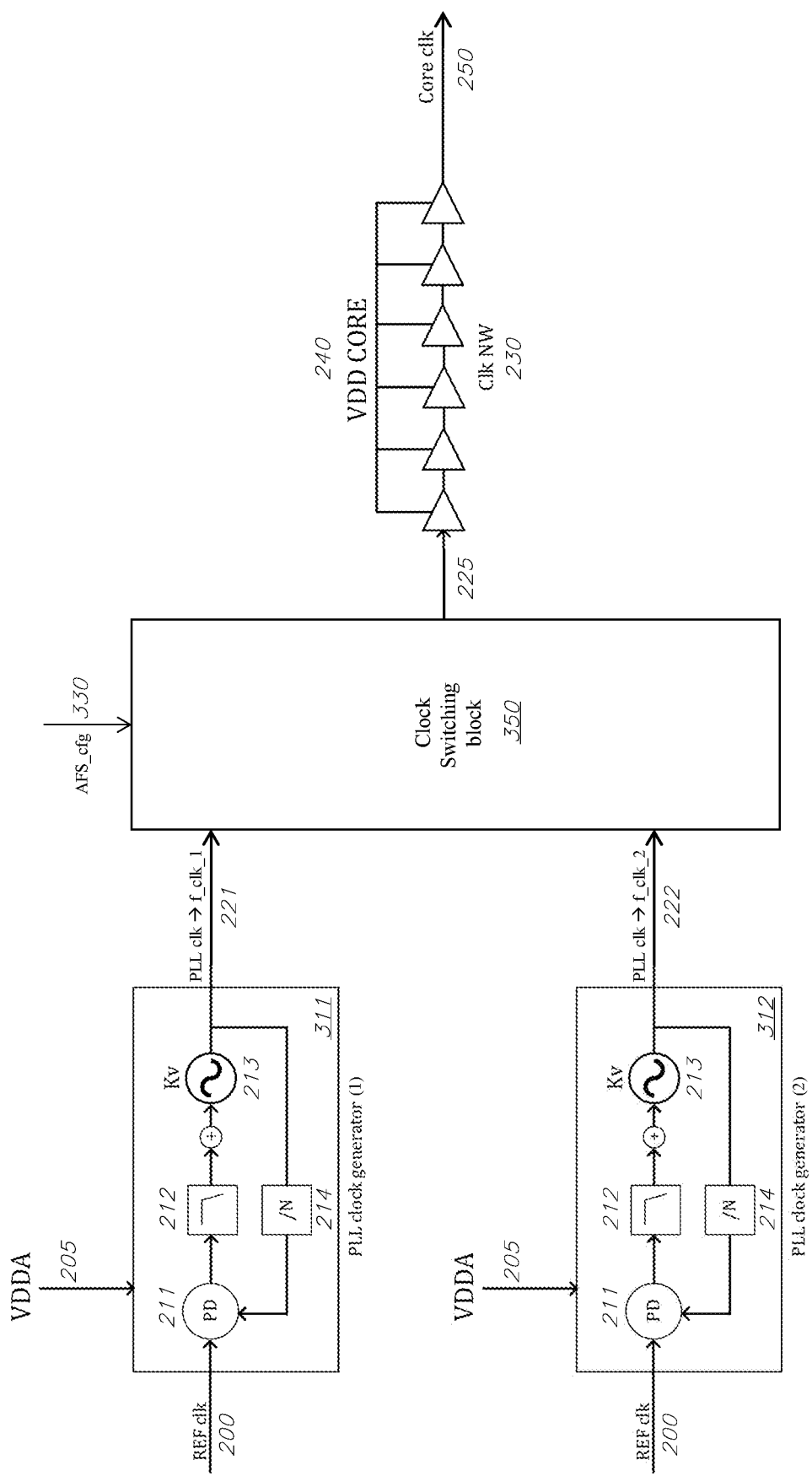
FIG. 7 schematically depicts an example clock generation and distribution circuit for a semiconductor IC with a second implementation of AFS.

AFS methods other than that shown in FIG. 6 are possible. With reference to FIG. 7, there is schematically depicted an example clock generation and distribution circuit for a semiconductor IC with a second implementation of AFS. This alternative AFS method uses two (or more) clock generators, specifically first clock generator 311 and second clock generator 312, instead of a single clock generator 310 (based on a tunable AFS filter 320) of FIG. 6. Each of the first clock generator 311 and second clock generator 312 is structurally the same and as shown in FIG. 5, for instance. Where the same features as described in relation to FIG. 5 are shown, identical reference numerals have been used.

Each of the first clock generator 311 and second clock generator 312 is configured to generate a clock signal of a different clock frequency. Specifically: the first clock generator 311 is configured to generate a first PLL clock output 221 at a first clock frequency, f_clk_1; and the second clock generator 312 is configured to generate a second PLL clock output 222 at a second clock frequency, f_clk_2, wherein f_clk_1>f_clk_2 (for example, f_clk_1=1.1×f_clk_2). An AFS control circuit or clock switching block 350 rapidly switches between the two clock generators to provide a clock output 225 dependent on the VDD droop detected. For example, AFS configuration input 330 may be a control signal, that instructs the clock switching block 350 whether to output f_clk_1 or f_clk_2 as the clock output 225. The AFS configuration input 330, as previously discussed, may be affected by whether VDD droop has been detected or not. For example, the control signal which the AFS configuration input 330 provides may be 1 (high) when no AFS is required, and 0 (low) when AFS has to be activated in order to counteract the VDD droop. The opposite is also possible, of course. The average duty cycle of the control signal then reflects the average system performance.

Embodiments according to the disclosure may use any AFS technique.

As an alternative to the configuration of FIG. 7, a single clock generator may be used instead of the multiple clock generators shown in this figure, and a clock divider may be added to the configuration so as to divide the clock signal of that single clock generator into multiple (two or more) clock signals of different frequencies. The AFS control circuit or clock switching block then rapidly switches between these multiple clock signals to provide a clock output dependent on the VDD droop detected.

Figure 8:
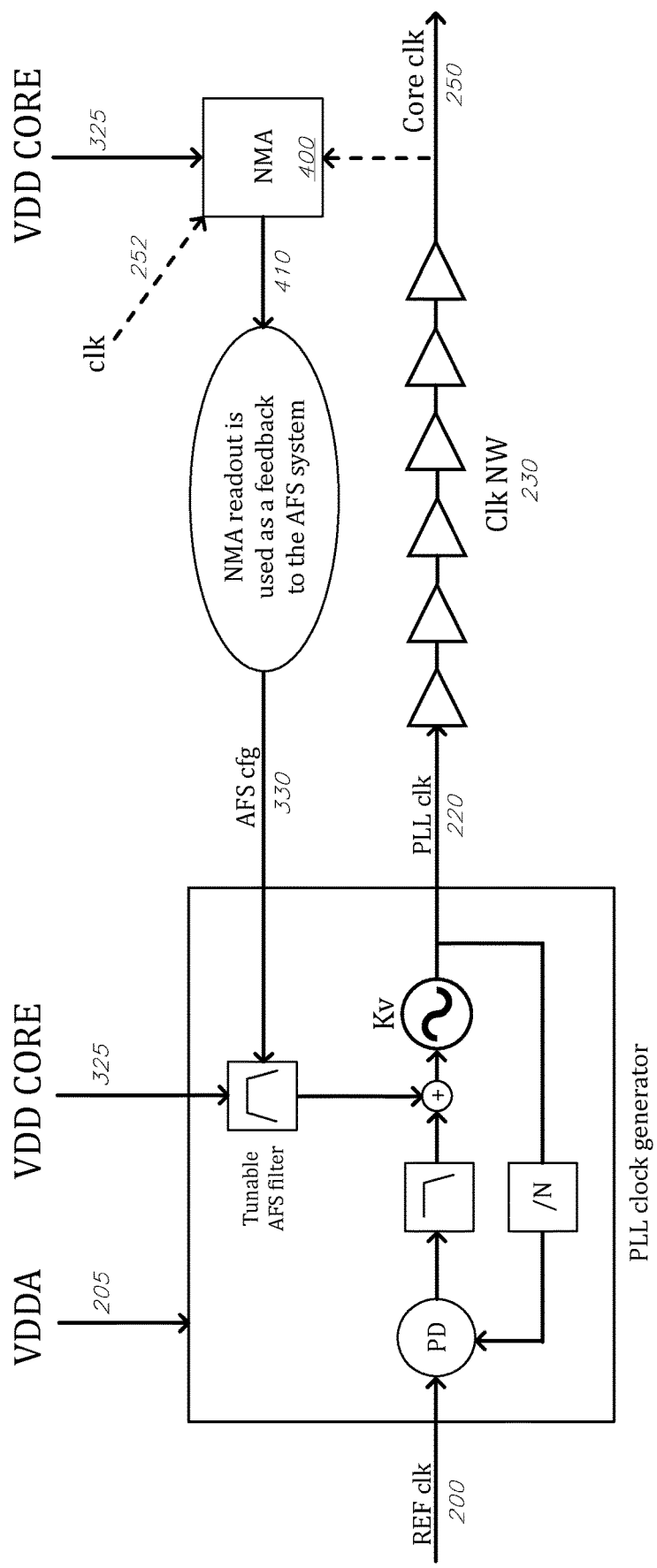
FIG. 8 schematically depicts a clock generation and distribution circuit for a semiconductor IC with AFS controlled by an output of a NMA.

With reference to FIG. 8, there is schematically depicted a clock generation and distribution circuit for a semiconductor IC with AFS controlled by an output of a NMA. Most features of this figure are the same as shown in FIG. 6 (with the same reference numerals are used to show the same features), except for the following: Additionally shown in FIG. 8 is NMA 400, which receives the core clock 250 and the VDD Core voltage 325 and uses these to generate an NMA output 410 (as discussed above with reference to FIG. 2). Alternatively, if it is desired to avoid a feedback loop configuration, NMA 400 may receive the signal of a different clock 252 instead of core clock 250. This may be useful, for example, to achieve DVFS (Dynamic Voltage and Frequency Scaling) functionality, as the dynamically-adjusted frequency of the core clock 250 will not affect the operation of NMA 400.

The NMA output 410, optionally subject to some further processing, is then used to derive the AFS configuration signal 330, to provide feedback to the AFS thereby. This may include operating the example clock generation and distribution circuit of FIG. 6 in a feedback loop mode, in which NMA 400 readouts continue to be taken while AFS is active, and the tunable AFS filter 320 is tuned, in real time, respective of these readouts: If one or more consecutive readouts (e.g., 1-5, 1-10, or 1-20 readouts) indicate that the effect of the AFS is insufficient (an undercompensation scenario), the tunable AFS filter 320 may be immediately controlled by the AFS configuration input 330 to effect further reduction of frequency. Conversely, if one or more consecutive readouts (e.g., 1-5, 1-10, or 1-20 readouts) indicate that the effect of the AFS is excessive (overcompensation), the tunable AFS filter 320 may be immediately controlled by the AFS configuration input 330 to effect an increase of frequency (or even complete deactivation of AFS). The same level in the tunable AFS filter 320 may be kept if the compensation is deemed proper.

In case a DVFS functionality is desired, and NMA is configured to receive clock signal 252 instead of a signal from core clock 250, then an input (not shown) to the clock divider/N may dictate the frequency scaling, so as to affect the frequency of PLL clock 220 and subsequently core clock 250.

Similar to the embodiment of FIG. 8, also the embodiment of FIG. 7 may be operated in a feedback loop mode. In this mode (not shown), NMA (TDC) readouts continue to be taken when AFS is active, and the AFS configuration input instructs the clock switching block to maintain current frequency or switch to the other frequency, respective of the NMA readouts.

Returning to the general terms discussed above, further details can now be described. For example in some embodiments, the AFS circuit may comprise AFS processing logic configured to receive the output of the NMA (parameter indicative of the effective cycle time of the clock), and control AFS operation in response to the received output of the NMA.

In certain embodiments, the AFS circuit may further comprise: a supply pin voltage input, arranged to receive a supply pin voltage for the IC; and a filter, configured to process the received supply pin voltage and generate a PLL filter input for input to a phase-locked loop (PLL) of a clock generator. Then, the AFS processing logic may be configured to control the PLL output in response to the received output of the NMA. The PLL filter input may be provided as an input to the PLL for summation with an output of a low pass filter of the PLL and/or as a component of an input to a signal generator of the PLL.

In some embodiments, the AFS processing logic comprises clock selection logic. The clock selection logic selects from one of a plurality of clock generator circuits, each clock generator circuit being configured to generate a clock signal of a respective, different frequency. The clock signal generated by the selected clock generator circuit advantageously provides the clock signal in the semiconductor IC.

According to certain embodiments, activation of the PLL filter input or clock selection logic may be controlled (by the AFS processing logic). Additionally or alternatively, the PLL filter input or clock selection logic may be adjusted (by the AFS processing logic), in response to the received output of the NMA (parameter indicative of the effective cycle time of the clock).

Figure 9:
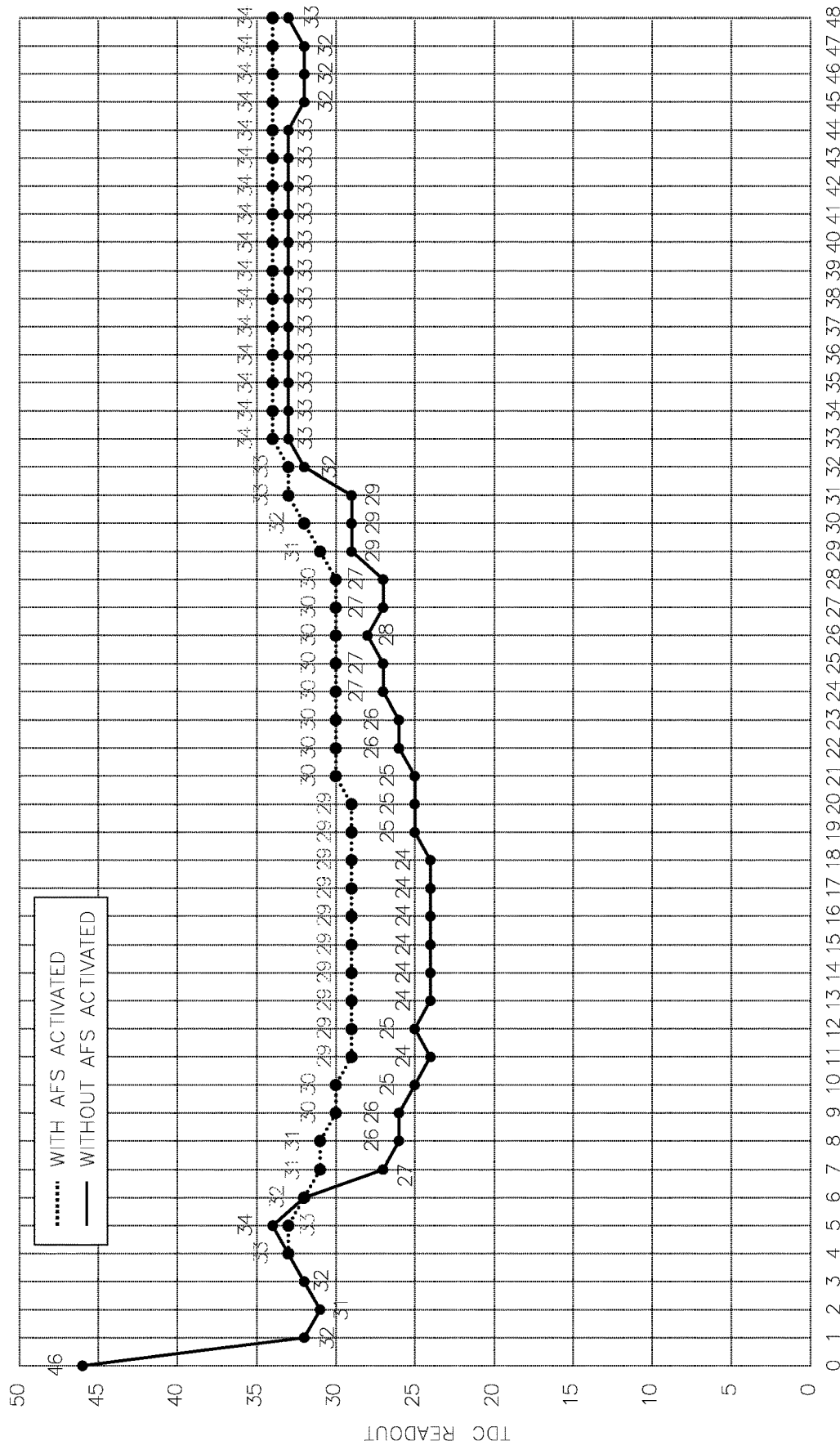
FIG. 9 shows the readout of FIGS. 4B and 5, illustrating an example control of AFS using the readout from a time-to-digital converter of a NMA.

With reference to FIG. 9, there is shown, with a continuous curve, the NMA (TDC) readout of FIGS. 4B and 5. There is also shown, with a dotted curve, a possible NMA (TDC) readout with AFS active, optionally in accordance with the embodiment of FIG. 7 which makes use of a tunable AFS filter. As shown, there is a substantial VDD droop occurring between clock cycles 0 and 1, detected by the NMA. AFS is then activated, and its effect is seen after brief response time of a few clock cycles, at clock cycle 4. Next, it is shown that AFS is able to adjust the core clock frequency such that the NMA (TDC) readouts are kept at a substantially higher level than what their level had been absent AFS: on average, between clock cycles 4 and 48, the result of activating the AFS is an approximate 15-20% increase in NMA readouts, which represent the average frequency compensation (average increase in the clock cycle time) that is needed to compensate the dynamic voltage droop.

Figure 10:
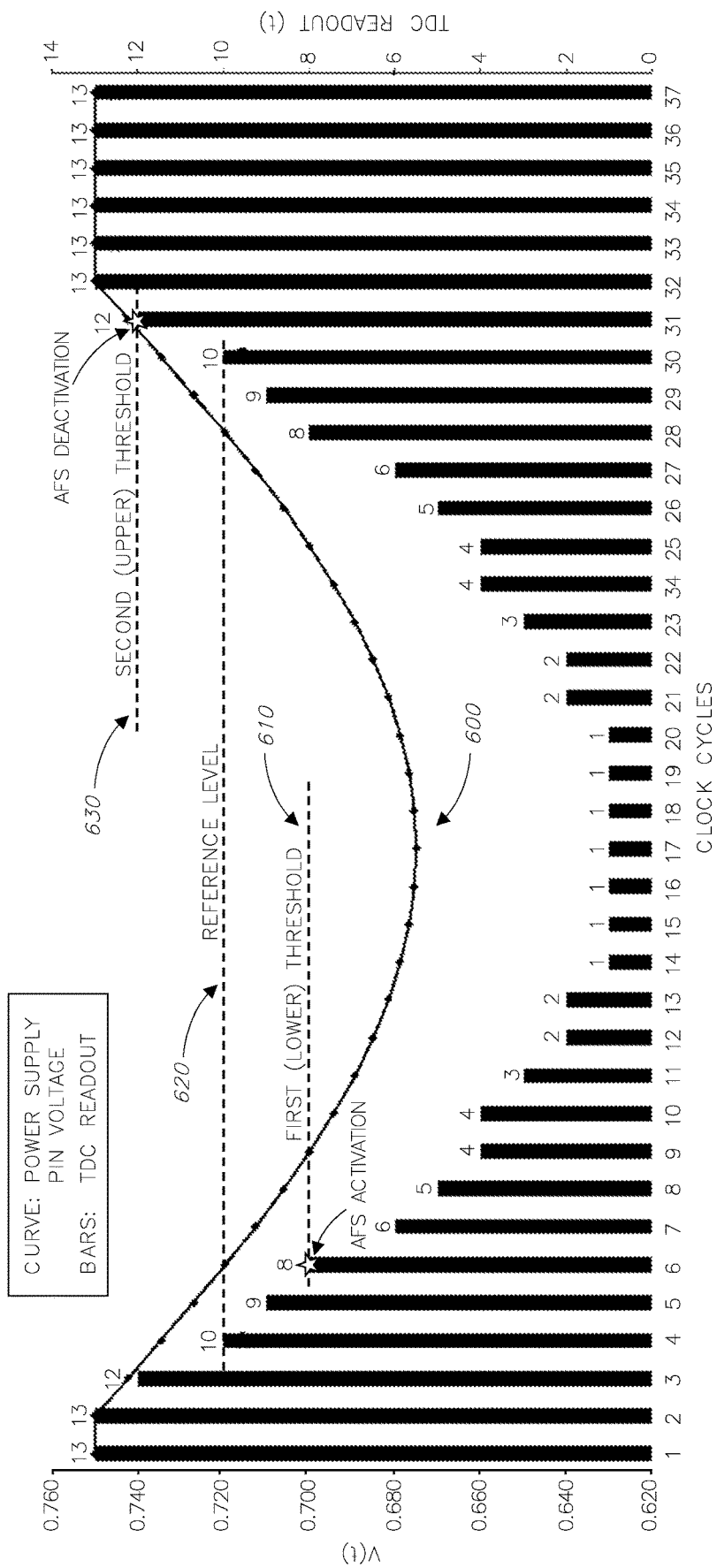
FIG. 10 plots a second example of a readout from a time-to-digital converter of a NMA, together with a corresponding power supply pin voltage of a semiconductor IC, further illustrating an example control of AFS.

With reference to FIG. 10, there is plotted a second example of a readout from a time-to-digital converter of a NMA, together with a corresponding power supply pin voltage 600 of a semiconductor IC, further illustrating an example control of AFS. This second example uses an AFS technique according to the alternative approach described above using two clock generators, with reference to FIG. 8. A first (lower) threshold 610 in respect of the NMA readout is used to determine that VDD droop is occurring and that AFS should therefore be activated. The clock frequency is therefore switched from higher frequency f_clk_1 to lower frequency f_clk_2. A second (upper) threshold 630 is used to determine that VDD droop is no longer taking place and the AFS should therefore be deactivated. As a result, the clock frequency is switched from lower frequency f_clk_2 back to higher frequency f_clk_1.

The first threshold 610 and the second threshold 630 are optionally determined in relation to a reference level 620. In this example, the reference level 620 is set to correspond with a NMA (TDC) readout of 10. The first threshold 610 is set to be at an activation level below the reference level 620. In this example, the activation level is set as 2, so the first threshold is set as 8. The second threshold 630 is set to be at a deactivation level above the reference level 620. In this example, the deactivation level is set as 2, so the second threshold is set as 12. By differentiating the first threshold 610 and the second threshold 630, a hysteresis effect is possible, which allows better operation of the AFS system.

Again referencing the general terms discussed above, further features may be considered. For example, the frequency of the clock signal may be adjusted (by activating the AFS circuit) if the output of the NMA (parameter indicative of the effective cycle time of the clock) descends below a first threshold. In some embodiments, a frequency of the clock signal may be adjusted back to its original value (by deactivating the AFS circuit) if the output of the NMA (parameter indicative of the effective cycle time of the clock) rises above a second threshold. The second threshold is advantageously higher than the first threshold.

In certain embodiments, when the AFS circuit is activated, the frequency of the clock signal may be reduced (by the AFS circuit) in response to the output of the NMA indicating a reduction in the effective cycle time of the clock signal.

In addition to the exemplary AFS activation points and thresholds discussed above with reference to FIGS. 9 and 10, any threshold-based or other rule-based mechanism to determine when to activate and deactivate an AFS circuit (or how to tune a tunable AFS circuit) based on the NMA (TDC) readout is intended herein.

The system may be operated in two modes. In AFS characterization mode, the NMA readout is used to tune the system response against VDD core level. Different tuning for different VDD levels may be set to avoid overcompensation and/or under-compensation. At a tester (off chip), the NMA readout can be used to tune the system response against a logic test (for VDD noise). At the system, the NMA readout can be used to tune the system response for each application. In a mission mode, the NMA readout can be used to protect the PLL from out-of-range voltage noise. When implementing AFS according to the first implementation (as shown in FIG. 6), there may be a concern that the AFS output signal 340, based on filtering the VDD noise amplitude and injected to the VCO 213 may be higher than a certain maximum limit. This may take the PLL out of lock. In this mode, the NMA readout may be used to mitigate such problems.

The NMA devices may be placed in timing-sensitive units. This may include placing them in the same blocks as Margin Agents (such as described in International Patent Application Publication No. WO2019/202595 A1, commonly assigned with the present application, and incorporated herein by reference in its entirety). The NMA device may be straightforward to integrate with the IC and operate in-situ.

Throughout this disclosure, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the disclosure, each of the words "comprise" "include" and "have", and forms thereof, are not necessarily limited to members in a list with which the words may be associated. In addition, where there are inconsistencies between this application and any document incorporated by reference, it is hereby intended that the present application controls.

To clarify the references in this disclosure, it is noted that the use of nouns as common nouns, proper nouns, named nouns, and the/or like is not intended to imply that embodiments of the invention are limited to a single embodiment, and many configurations of the disclosed components can be used to describe some embodiments of the invention, while other configurations may be derived from these embodiments in different configurations.

In the interest of clarity, not all of the routine features of the implementations described herein are shown and described. It should, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure.

Based upon the teachings of this disclosure, it is expected that one of ordinary skill in the art will be readily able to practice the present invention. The descriptions of the various embodiments provided herein are believed to provide ample insight and details of the present invention to enable one of ordinary skill to practice the invention. Moreover, the various features and embodiments of the invention described above are specifically contemplated to be used alone as well as in various combinations.

Conventional and/or contemporary circuit design and layout tools may be used to implement the invention. The specific embodiments described herein, and in particular the various circuit arrangements, measurements and data flows, are illustrative of exemplary embodiments, and should not be viewed as limiting the invention to such specific implementation choices. Accordingly, plural instances may be provided for components described herein as a single instance. The determination of margin and/or other parameters may be made in different parts of the configuration, for example. The design of PLL and/or AFS shown and discussed in the disclosure may be varied and approaches in accordance with the disclosure may be applied to other types of PLL and/or AFS. Additionally or alternatively, the approach for integrating the NMA readout with AFS may be varied from that described herein.

While circuits and physical structures are generally presumed, it is well recognized that in modern semiconductor design and fabrication, physical structures and circuits may be embodied in computer readable descriptive form suitable for use in subsequent design, test or fabrication stages as well as in resultant fabricated semiconductor integrated circuits. Accordingly, claims directed to traditional circuits or structures may, consistent with particular language thereof, read upon computer readable encodings (which may be termed programs) and representations of same, whether embodied in media or combined with suitable reader facilities to allow fabrication, test, or design refinement of the corresponding circuits and/or structures. Structures and functionality presented as discrete components in the exemplary configurations may be implemented as a combined structure or component. The invention is contemplated to include circuits, systems of circuits, related methods, and computer-readable (medium) encodings of such circuits, systems, and methods, all as described herein, and as defined in the appended claims. As used herein, a computer readable medium includes at least disk, tape, or other magnetic, optical, semiconductor (e.g., flash memory cards, ROM), or electronic medium and a network, wireline, wireless or other communications medium.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. It is only the following claims, including all equivalents, which are intended to define the scope of this invention. Moreover, the techniques described herein may also be applied to other types of circuit applications. Accordingly, other variations, modifications, additions, and improvements may fall within the scope of the invention as defined in the claims that follow.

Embodiments of the present invention may be used to fabricate, produce, and/or assemble integrated circuits and/or products based on integrated circuits.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A controller for generation of a clock signal in a semiconductor integrated circuit (IC), the controller comprising:
    a Noise Modulation Agent (NMA) configured to measure the clock signal and output a parameter indicative of an effective cycle time of the clock signal; and
    an Adaptive Frequency Scaling (AFS) circuit configured to adjust a frequency of the clock signal based on the output of the NMA indicating a change in a power supply voltage of the semiconductor IC, wherein the AFS circuit is further configured to activate the adjustment of the frequency of the clock signal if the output of the NMA descends below a first threshold.

2. The controller according to claim 1, wherein the AFS circuit is further configured to deactivate the adjustment of the frequency of the clock signal if the output of the NMA rises above a second threshold, the second threshold being higher than the first threshold.

3. The controller according to claim 1, wherein the AFS circuit is further configured, when activated, to reduce the frequency of the clock signal in response to the output of the NMA indicating a reduction in the effective cycle time of the clock signal.

4. The controller according to claim 1, wherein the NMA comprises:
    a time-to-digital converter arranged to output a measurement of a cycle time of an input clock signal, the parameter indicative of an effective cycle time of the clock signal being based on the measurement output of the time-to-digital converter.

5. The controller according to claim 4, wherein the time-to-digital converter comprises a tapped delay line.

6. The controller according to claim 4, wherein the NMA further comprises:
    an input arranged to receive the clock signal;
    a clock divider configured to divide the received clock signal and provide a divided clock signal;
    a calibration buffer configured to adjust the divided clock signal, the input clock signal of the time-to-digital converter being the adjusted divided clock signal; and
    NMA processing logic configured to receive the measurement output from the time-to-digital converter and generate the parameter indicative of an effective cycle time of the clock signal.

7. The controller according to claim 1, wherein the AFS circuit comprises:
    a supply pin voltage input arranged to receive a supply pin voltage for the semiconductor IC;
    a filter configured to process the received supply pin voltage and generate a PLL filter input for input to a phase-locked loop (PLL) of a clock generator; and
    AFS processing logic configured to receive the output of the NMA and, in response to the received output of the NMA, control an output of the PLL.

8. The controller according to claim 7, wherein the PLL filter input is provided as an input to the PLL for summation with an output of a low pass filter of the PLL and/or as a component of an input to a signal generator of the PLL.

9. The controller according to claim 8, wherein the AFS circuit comprises:
    AFS processing logic comprising clock selection logic configured to select one from a plurality of clock generator circuits, wherein each clock generator circuit is configured to generate a clock signal of a respective, different frequency, and wherein the clock signal generated by the selected clock generator circuit provides the clock signal in the semiconductor IC.

10. The controller according to claim 9, wherein the AFS processing logic is configured to perform one or both of:
    activate the PLL filter input or the clock selection logic, in response to the received output of the NMA; and
    adjust the PLL filter input or the clock selection logic, in response to the received output of the NMA.

11. The controller according to claim 1, wherein the change in the power supply voltage indicated by the output of the NMA is a voltage droop.

12. A method for generating a clock signal in a semiconductor integrated circuit (IC), the method comprising:
    measuring the clock signal to provide a parameter indicative of an effective cycle time of the clock signal;
    adjusting or switching a frequency of the clock signal, based on the parameter indicative of the effective cycle time of the clock signal indicating a change in a power supply voltage of the semiconductor IC, using an Adaptive Frequency Scaling (AFS) circuit; and
    activating the adjustment or the switching of the frequency of the clock signal if the parameter indicative of the effective cycle time of the clock signal descends below a first threshold, wherein the step of measuring the clock signal is performed by a Noise Modulation Agent (NMA), and wherein the parameter indicative of the effective cycle time of the clock signal is an output of the NMA.

13. The method according to claim 12, further comprising deactivating the adjustment or the switching of the frequency of the clock signal if the parameter indicative of the effective cycle time of the clock signal rises above a second threshold, the second threshold being higher than the first threshold.

14. The method according to claim 12, further comprising:
    when the AFS circuit is activated, reducing the frequency of the clock signal in response to the parameter indicative of the effective cycle time of the clock signal indicating a reduction in the effective cycle time of the clock signal.

15. The method according to claim 12, wherein the NMA comprises a time-to-digital converter, arranged to output a measurement of a cycle time of an input clock signal, wherein the parameter indicative of an effective cycle time of the clock signal is based on the measurement output of the time-to-digital converter.

16. The method of claim 15, further comprising:
receiving the clock signal at the NMA;
dividing the received clock signal to provide a divided clock signal;
adjusting the divided clock signal using a calibration buffer;
measuring a cycle time of the adjusted divided clock signal at the time-to-digital converter; and
generating the parameter indicative of an effective cycle time of the clock signal using the measurement output from the time-to-digital converter.

17. The method according to claim 12, further comprising:
receiving a supply pin voltage for the semiconductor IC;
processing the received supply pin voltage at a filter and generating a PLL filter input for input to a phase-locked loop (PLL) of a clock generator; and
receiving the parameter indicative of the effective cycle time of the clock signal and, in response to the received parameter indicative of the effective cycle time of the clock signal, controlling an output of the PLL.

18. The method according to claim 17, further comprising:
selecting one from a plurality of clock generator circuits, wherein each clock generator circuit is configured to generate a clock signal of a respective, different frequency, and wherein the clock signal generated by the selected clock generator circuit provides the clock signal in the semiconductor IC.

19. The method according to claim 18, further comprising one or both of:
activating the PLL filter input or performing the step of selecting, in response to the received parameter indicative of the effective cycle time of the clock signal; and
adjusting the PLL filter input or the selecting of one from the plurality of clock generator circuits, in response to the received parameter indicative of the effective cycle time of the clock signal.

20. The method according to claim 12, wherein the change in the power supply voltage is a voltage droop.

* * * * *